(12) United States Patent
Kano et al.

(10) Patent No.: US 12,191,495 B2
(45) Date of Patent: Jan. 7, 2025

(54) ELECTRODE, NONAQUEOUS ELECTROLYTE BATTERY, AND BATTERY PACK

(71) Applicant: Kabushiki Kaisha Toshiba, Tokyo (JP)

(72) Inventors: Tetsuro Kano, Kanagawa (JP); Yuki Watanabe, Kanagawa (JP); Hidetoshi Watanabe, Kanagawa (JP); Keigo Hoshina, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 488 days.

(21) Appl. No.: 17/466,391

(22) Filed: Sep. 3, 2021

(65) Prior Publication Data

US 2021/0399307 A1 Dec. 23, 2021

Related U.S. Application Data

(63) Continuation of application No. PCT/JP2019/012883, filed on Mar. 26, 2019.

(51) Int. Cl.
*H01M 4/00* (2006.01)
*H01M 4/485* (2010.01)
(Continued)

(52) U.S. Cl.
CPC ........... *H01M 4/623* (2013.01); *H01M 4/485* (2013.01); *H01M 4/505* (2013.01); *H01M 4/525* (2013.01);
(Continued)

(58) Field of Classification Search
CPC .............. H01M 4/623; H01M 4/505; H01M 2004/028; H01M 4/485; H01M 10/0525; H01M 4/525
See application file for complete search history.

(56) References Cited

U.S. PATENT DOCUMENTS

| 10,615,405 B2 | 4/2020 | Chauveau et al. |
| 2005/0191550 A1 | 9/2005 | Satoh et al. |

(Continued)

FOREIGN PATENT DOCUMENTS

| CN | 109428076 A | * | 3/2019 | ............ C01G 53/50 |
| JP | 4686974 | | 5/2011 | |

(Continued)

OTHER PUBLICATIONS

Heon et al., Method Of The Cathode Active Material Precursor, A Positive Active Material, Preparing The Positive Active Material, Positive Electrode And Lithium Battery, Mar. 2019, See the Abstract. (Year: 2019).*

(Continued)

*Primary Examiner* — Anca Eoff
*Assistant Examiner* — Monique M Wills
(74) *Attorney, Agent, or Firm* — Oblon, McClelland, Maier & Neustadt, L.L.P.

(57) ABSTRACT

An electrode includes an active material-containing layer that contains active material particles and a binder containing a polymer. The active material particles contain a lithium-containing nickel-cobalt-manganese composite oxide represented by $Li_aNi_{(1-x-y)}Co_xMn_yM_zO_2$ where $0.9 \le a \le 1.2$, $0 < x \le 0.5$, $0 < y \le 0.5$, $0 < z \le 0.1$, $x \ge y$, $0.4 \le 1-x-y \le 0.8$, and M is at least one element selected from B, Mg, Al, Si, Ca, Ti, Zn, Zr, Sn, and W. The polymer has a repeating unit derived from vinylidene fluoride and one or more peaks in a nuclear magnetic resonance spectrum with fluorine-19 as a detection nucleus are located in the range of −90 ppm or higher and −88 ppm or lower.

20 Claims, 7 Drawing Sheets

(51) Int. Cl.
*H01M 4/505* (2010.01)
*H01M 4/525* (2010.01)
*H01M 4/62* (2006.01)
*H01M 10/0525* (2010.01)
*H01M 4/02* (2006.01)

(52) U.S. Cl.
CPC .. *H01M 10/0525* (2013.01); *H01M 2004/021* (2013.01); *H01M 2004/027* (2013.01); *H01M 2004/028* (2013.01); *H01M 2220/20* (2013.01)

(56) References Cited

U.S. PATENT DOCUMENTS

| | | |
|---|---|---|
| 2012/0264021 A1 | 10/2012 | Sugiura et al. |
| 2012/0270093 A1 | 10/2012 | Isozaki et al. |
| 2013/0045421 A1 | 2/2013 | Kobino et al. |
| 2013/0280586 A1 | 10/2013 | Isozaki et al. |
| 2013/0330615 A1 | 12/2013 | Morita et al. |
| 2015/0079470 A1 | 3/2015 | Kano et al. |

FOREIGN PATENT DOCUMENTS

| | | |
|---|---|---|
| JP | WO 2012/144298 A | 10/2012 |
| JP | 2013-73670 A | 4/2013 |
| JP | 2014-154445 | 8/2014 |
| JP | 5672442 | 2/2015 |
| JP | 2015-84323 A | 4/2015 |
| JP | 2017-37776 A | 2/2017 |
| JP | 6281488 B2 | 2/2018 |
| JP | 2018-511143 A | 4/2018 |
| JP | 2018-190527 | 11/2018 |
| JP | 2018-190527 A | 11/2018 |
| WO | WO 2012/111116 A1 | 8/2012 |
| WO | WO 2015/151501 | 10/2015 |
| WO | WO-2019054411 A1 * | 3/2019 ........... C07D 327/00 |

OTHER PUBLICATIONS

Hasegawa, Lithium Ion Secondary Battery, Mar. 2019, See the Abstract. (Year: 2019).*
Extended European Search Report issued Apr. 8, 2022 in European Patent Application No. 19921755.5, 8 pages.
Japanese Office Action issued Aug. 30, 2022 in Japanese Patent Application No. 2021-508473, 4 pages.
International Search Report issued Jul. 2, 2019 in PCT/JP2019/012883, 2 pages.

* cited by examiner

ELECTRODE, NONAQUEOUS ELECTROLYTE BATTERY, AND BATTERY PACK

CROSS-REFERENCE TO RELATED APPLICATION(S)

This application is a continuation of International Patent Application No. PCT/JP2019/012883 filed Mar. 26, 2019, the entire contents of which are incorporated herein by reference.

FIELD

Embodiments described herein relate generally to an electrode, a nonaqueous electrolyte battery, and a battery pack.

BACKGROUND

In a nonaqueous electrolyte battery which contains a large amount of an alkaline component in the electrode, the side reaction occurs between an active material and the alkaline component. When a side reaction occurs, for example, gas is generated or the active material is covered with a compound produced by the side reaction, leading to an increase in the internal resistance of the nonaqueous electrolyte battery. The increase of the internal resistance may unfortunately be a factor of deterioration in the input-output characteristics.

It is an object of the present application to provide an electrode in which an increase in the resistance is prevented, and a nonaqueous electrolyte battery and a battery pack that include such an electrode.

Solution to Problem

In general, according to a first embodiment, an electrode includes an active material-containing layer. The active material-containing layer contains active material particles and a binder containing a polymer. The active material particles contain a lithium-containing nickel-cobalt-manganese composite oxide represented by $Li_aNi_{(1-x-y)}Co_xMn_yM_zO_2$ ($0.9 \leq a \leq 1.2$, $0 < x \leq 0.5$, $0 < y \leq 0.5$, $0 < z \leq 0.1$, $x \geq y$, $0.4 \leq 1-x-y \leq 0.8$, M is at least one element selected from the group consisting of B, Mg, Al, Si, Ca, Ti, Zn, Zr, Sn, and W). The polymer has a repeating unit derived from vinylidene fluoride and one or more peaks in a nuclear magnetic resonance spectrum with fluorine-19 as a detection nucleus are located in the range of −90 ppm or higher and −88 ppm or lower.

A second embodiment provides a nonaqueous electrolyte battery. The nonaqueous electrolyte battery includes the electrode of the first embodiment as a positive electrode, a negative electrode, and a nonaqueous electrolyte.

A third embodiment provides a battery pack. The battery pack includes the nonaqueous electrolyte battery of the second embodiment.

DETAILED DESCRIPTION

Figure 1:
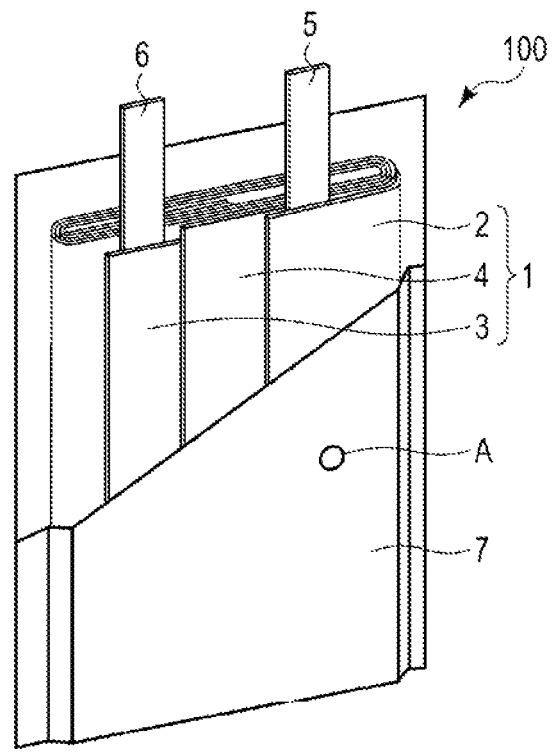
FIG. 1 is a perspective view with a part cut out illustrating an example of a nonaqueous electrolyte battery according to a second embodiment.

Embodiments will be described below with reference to the drawings. It is noted that the same signs are put on the respective same components throughout the embodiments, and repetitive statements are omitted. Each drawing is a schematic view for explanation and sufficient understanding of an embodiment. The shape, size, ratio, and the like may be different from those of the actual device. These may be appropriately modified in design in light of the following explanation and known techniques.

First Embodiment

A first embodiment provides an electrode. The electrode includes an active material-containing layer. The active material-containing layer contains active material particles and a binder containing a polymer. The active material particles contain a lithium-containing nickel-cobalt-manganese composite oxide represented by $Li_aNi_{(1-x-y)}Co_xMn_yM_zO_2$ ($0.9 \leq a \leq 1.2$, $0 < x \leq 0.5$, $0 < y \leq 0.5$, $0 < z \leq 0.1$, $x \geq y$, $0.4 \leq 1-x-y \leq 0.8$, M is at least one element selected from the group consisting of B, Mg, Al, Si, Ca, Ti, Zn, Zr, Sn, and W). The polymer has a repeating unit derived from vinylidene fluoride, and one or more peaks in the nuclear magnetic resonance spectrum with fluorine-19 as the detection nucleus are located in the range of −90 ppm or higher and −88 ppm or lower.

In the active material particles containing a lithium-containing nickel-cobalt-manganese composite oxide represented by $Li_aNi_{(1-x-y)}Co_xMn_yM_zO_2$ ($0.95 \leq a \leq 2$, $0 < x \leq 0.5$, $0 < y \leq 0.5$, $0 < z \leq 0.1$, $x \geq y$, $0.4 \leq 1-x-y \leq 0.8$, M is at least one element selected from the group consisting of B, Mg, Al, Si, Ca, Ti, Zn, Zr, Sn, and W), the Co content is larger than the Mn content. In such a lithium-containing nickel-cobalt-manganese composite oxide, for example, an alkaline component (for example, lithium hydroxide, lithium carbonate) is likely to remain in the active material. The remaining alkaline component is decomposed on a surface of the active material to become a coating component. In addition, a gas, for example, carbon dioxide, is generated by decomposition of the remaining alkaline component. For these reasons, for example, the effective reaction area on the active material surface is reduced to increase the resistance.

Thus, an active material-containing layer is made to contain a binder containing a polymer, the polymer having a repeating unit derived from vinylidene fluoride, and having one or more peaks in the nuclear magnetic resonance spectrum with fluorine-19 as the detection nucleus are located in the range of −90 ppm or higher and −88 ppm or lower. The binder containing a polymer is, for example, deposited so as to cover at least a part of the active material surface and the remaining alkaline component deposited on the active material surface. As a result, an increase in the resistance can be prevented.

The polymer desirably contains at least one functional group selected from the group consisting of a carbonyl group, an ester bond, and a chloro group.

An active material-containing layer that contains a binder containing such a polymer has a large interaction of the binder with the active material surface and the remaining alkaline component deposited on the active material surface, and thus, for example, the binder is likely to be deposited so as to cover the remaining alkaline component. As a result, an increase in the resistance can further be prevented.

The active material-containing layer desirably contains active material-containing layer-constituting particles which contain active material particles and a binder, the active material-containing layer-constituting particles giving, by a laser diffractive scattering method, a particle size distribution chart having a peak A and a peak B with different modal diameters, the modal diameter DA of the peak A being smaller than the modal diameter DB of the peak B, the ratio PA/PB of the frequency PA at the modal diameter DA to the frequency PB at the modal diameter DB being in the range of 0.15 or more and 1.5 or less.

When a peak A and a peak B with different modal diameters are present in a particle size distribution chart obtained by subjecting the active material-containing layer-constituting particles to a laser diffractive scattering method, the space-filling property with the active material-constituting particles is enhanced. Thus, the energy density of the nonaqueous electrolyte battery can be increased.

In addition, for the active material-containing layer-constituting particles, the modal diameter DA of the peak A is smaller than the modal diameter DB of the B, and the ratio PA/PB of the frequency PA at the modal diameter DA to the frequency PB at the modal diameter DB is in the range of 0.15 or more and 1.5 or less. In such active material-containing layer-constituting particles, the interaction between the active material and the binder is sufficient and the binder is deposited so as to appropriately cover the active material surface and the remaining alkaline component deposited on the active material surface. As a result, an increase in the resistance can be greatly prevented.

The binder is desirably contained in an amount of 0.2 parts by mass or more and 3.5 parts by mass or less relative to 100 parts by mass of the active material particles.

An electrode which satisfies the above conditions has the surface with the active material surface coated with the binder in a certain proportion. Thus, the binder is deposited on the remaining alkaline component so as to sufficiently cover the active material surface and the remaining alkaline component deposited on the active material surface. As a result, an increase in the resistance can still further be prevented.

The average particle size (D50) in the particle size distribution chart is desirably in the range of 1.5 μm or more and 6 μm or less.

In active material-containing layer-constituting particles satisfying the average particle size (D50), the binder is appropriately deposited on the surface of the active material particles and on the surface of the remaining alkaline component deposited on the active material surface, and thus, the reaction area of the surface of the active material particles can be sufficiently ensured. As a result, an increase in the resistance can be further greatly prevented.

The electrode according to the first embodiment will be described in detail below.

The electrode according to the first embodiment includes a current collector, and an electrode mixture layer as an active material-containing layer supported on one side or both sides of the current collector. The electrode mixture layer contains active material particles and a binder.

<Active Material>

The active material contains a lithium-containing nickel-cobalt-manganese composite oxide.

The lithium-containing nickel-cobalt-manganese composite oxide preferably has a composition formula of $Li_a Ni_{(1-x-y)} Co_x Mn_y M_z O_2$. Here, preferably, the subscript a is in the range of $0.9 \leq a \leq 1.2$, the subscript x is in the range of $0 < x \leq 0.5$, the subscript y is in the range of $0 < y \leq 0.5$, the subscript z is in the range of $0 < z \leq 0.1$, $x \geq y$ and $0.4 \leq 1-x-y \leq 0.8$ are satisfied, and M is at least one element selected from the group consisting of B, Mg, Al, Si, Ca, Ti, Zn, Zr, Sn, and W. When such an active material is used, an increase in the resistance can be prevented.

Another active material may be used in combination with the active material. As another active material, for example, a lithium-containing nickel oxide, a lithium-containing nickel-cobalt composite oxide, a lithium-containing manganese-cobalt composite oxide, a lithium-containing iron phosphate, and the like are exemplified. The kind of the active materials may be one or may be two or more.

The active material may contain a remaining alkali. The remaining alkali means lithium carbonate or lithium hydroxide that is not incorporated in the crystal structure of the active material. The Li content in the lithium compound is not reflected in the Li content in the active material. For example, when a lithium-containing nickel-cobalt-manganese composite oxide represented by $Li_a Ni_{(1-x-y)} Co_x Mn_y M_z O_2$ is used as an active material, the Li content in the remaining alkali is not reflected in the subscript a which represents the Li content in the composition formula.

In such an active material, a Ni atom in the crystal structure in the active material may move to a Li atom site that is an empty site in formation of the active material. In order to prevent such movement of atoms in the crystal structure, a lithium compound as a Li source is added in an excess amount. Thus, an alkaline component that is not incorporated in the crystal structure is likely to remain in the active material.

The active material particles may be a mixture of primary particles and secondary particles. A secondary particle is an aggregate of primary particles. The secondary particle is preferably filled with primary particles. Thus, reduction in the electrode density can be prevented.

The lithium-containing nickel-cobalt-manganese composite oxide has, for example, a higher proportion of particles present as secondary particles based on the total number of particles. In addition, the lithium-containing cobalt oxide has a higher proportion of particles present as primary particles based on the total number of particles. The lithium-containing manganese oxide has a higher proportion of particles present as primary particles based on the total number of particles.

The active material particles have an average particle size of, for example, 1 μm or more and 15 μm or less, and preferably 3 μm or more and 10 μm or less. If the active material particles have an average particle size in this range, an appropriate ratio of the existing secondary particles and primary particles can be achieved such that the initial resistance of the battery is reduced upon disentangling a part of the secondary particles by dispersion.

<Binder>

The binder contains a polymer. The polymer preferably contains, for example, poly(vinylidene fluoride) (PVdF) as a basic skeleton. By such a polymer, the binder can cover the active material surface and the alkaline component remaining on the active material surface.

Preferably, the polymer contained in the binder has a repeating unit derived from vinylidene fluoride and one or more peaks in the nuclear magnetic resonance spectrum with fluorine-19 as the detection nucleus (19F-NMR spectrum) are located in the range of −90 ppm or higher and −88 ppm or lower. The peaks to be analyzed here are peaks having a peak intensity (%) relative to a reference peak of 5% or more and being present in the range of −90 ppm or higher and −88 ppm or lower. The reference peak is a peak having the maximum intensity among peaks present in the range of −94 ppm or higher and −93 ppm or lower. Among these peaks to be analyzed, two peaks are considered as independent peaks when the chemical shift corresponding to the maximum intensity of one peak is 0.1 ppm or more apart from the chemical shift corresponding to the maximum intensity of another peak.

When the above condition is satisfied, an increase in the resistance of the electrode can be prevented. The reason is as follows. When a slurry obtained by mixing an active material and a binder containing a polymer that has a repeating unit derived from vinylidene fluoride is more appropriately distributed, for example, by bead mill dispersion, a state where the binder is deposited so as to appropriately cover the active material surface is obtained. As a result, the above binder can exist so as to cover the surface of the remaining alkaline component deposited on the active material surface. Here, an example of the state of appropriately covering deposition is, for example, a state where the binder is deposited so as to cover the alkaline component deposited on the vicinity of the active material and is not deposited so as to excessively cover the active material particles. The vicinity of the active material may include a surface of a component or member that constitutes an electrode and that can exist around the active material, for example, surfaces of an active material, a binder, electrode mixture layer-constituting particles, a conducting agent, and a current collector.

When the binder is deposited so as to appropriately cover the active material surface, interaction occurs between the surface of the active material particles and the binder, and thus distortion occurs in the basic skeleton of the binder, for example, the repeating units derived from vinylidene fluoride. This distortion may be, for example, such distortion that the basic skeleton of the binder is distorted or may be such a distortion that the chemical structure of the basic skeleton itself of the binder is distorted. This distortion is detected as one or more peaks in the range of −90 ppm or higher and −88 ppm or lower by subjecting a binder component extracted from an electrode mixture layer to 19F-NMR spectrum measurement. That is, when such a peak is detected, this means that the binder interacts with the active material surface to give a state where the binder is deposited so as to appropriately cover the active material particles and the remaining alkaline component. On the other hand, when such a peak is not detected, the binder does not sufficiently interact with the active material surface, not giving a state where the binder is deposited so as to appropriately cover the active material particles and the remaining alkaline component.

However, even if a lithium-containing nickel-cobalt-manganese composite oxide and a binder containing a polymer having vinylidene fluoride as a basic skeleton are simply mixed, an effect of preventing an increase in the resistance is not obtained. This is because simple mixing hardly allows the binder to be deposited so as to sufficiently cover the surface of the remaining alkali component deposited on the active material surface.

In addition, when a slurry obtained by mixing an active material and a binder containing a polymer having a repeating unit derived from vinylidene fluoride is excessively dispersed, an effect of preventing an increase in the resistance is not obtained. This is because the binder is deposited so as to excessively cover the active material surface and thus the redox reaction of Li ions in the active material surface is inhibited to thereby increase the resistance in the electrode, increasing the resistance of the nonaqueous electrolyte battery.

When the above binder is used, the reactivity of the active material surface can be reduced to a certain degree, and thus, a side reaction, such as oxidative decomposition of the electrolyte solvent, electrolyte, or the like, and growing of a film which is produced by a side reaction and which may become a resistance component are prevented. Thus, an increase in the resistance of the electrode is prevented, and as a result, an increase in the resistance of the nonaqueous electrolyte battery can be prevented.

Furthermore, when the binder is deposited so as to cover the active material surface, in other words, when the active material surface is protected by the binder, irreversible change in the crystal structure which may occur in the redox reaction of Li ions is prevented. This may prevent an increase in the resistance of the electrode and may prevent a decrease in the capacity of the nonaqueous electrolyte battery.

The binder is preferably a compound in which a substituent other than poly(vinylidene fluoride) (PVdF) is incorporated in a repeating structure of poly(vinylidene fluoride) (PVdF). At least one functional group selected from the group consisting of a carbonyl group, an ester bond, and a chloro group is preferably contained as the substituent. When the binder has such a substituent, the interaction of the binder with the active material surface and the remaining alkaline component becomes larger. As a result, the binder is likely to be deposited on the active material surface and the remaining alkaline component and an increase in the resistance of the electrode is further prevented and as a result, an increase in the resistance of the nonaqueous electrolyte battery is still further prevented.

Examples of the binder include polytetrafluoroethylene (PTFE), poly(vinylidene fluoride) (PVdF), or fluororubber. The kind of the binders used may be one or may be two or more.

The binder is preferably contained in an amount of 0.2 parts by mass or more and 3.5 parts by mass or less relative to 100 parts by mass of the active material particles. When the binder is contained in an amount in the range of 0.2 parts by mass or more and 3.5 parts by mass or less relative to 100 parts by mass of the active material particles, the binder having high affinity to the active material exists in an appropriate degree, and is deposited so as to cover the active material surface in an appropriate degree. Thus, an increase in the resistance of the electrode is prevented and thus an increase in the resistance of the nonaqueous electrolyte battery can be prevented.

The number of the repeating units derived from poly(vinylidene fluoride) (PVdF) contained in the binder can be estimated by measuring the weight average molecular weight by a measurement method as described later. That is, as the weight average molecular weight is larger, the number of the repeating units per molecule is larger. It is noted that the constituting elements and chemical structure of the repeating unit itself can be identified, for example, by subjecting a sample obtained according to an extraction method of the electrode mixture layer as described later to infrared spectroscopy and nuclear magnetic resonance spectrum measurement.

<Conducting Agent>

The electrode mixture layer may further contain a conducting agent. The conducting agent can enhance the electric conductivity and reduce the contact resistance with a current collector. As the conducting agent, for example, a carbon material, such as acetylene black, carbon black, graphite, carbon nanofiber, or carbon nanotube, is contained. The kind of the conducting agents used may be one or may be two or more.

<Electrode Mixture Layer-Constituting Particles>

The electrode mixture layer may contain electrode mixture layer-constituting particles as active material-containing layer-constituting particles. The electrode mixture layer-constituting particles contain at least an aggregate in which the active material particles and the binder containing a polymer are aggregated. In addition, the electrode mixture layer-constituting particles may contain a conducting agent.

The electrode mixture layer-constituting particles preferably give, by a laser diffractive scattering method, a particle size distribution chart having a peak A and a peak B with different modal diameters. The modal diameter is the particle size corresponding to the peak top. The peak top is the maximum frequency of the subject peak.

Having peaks with different modal diameters means that electrode mixture layer-constituting particles having different particle diameters are present. In this case, the space-filling property with the electrode mixture layer-constituting particles is enhanced as compared with the case of not having peaks with different modal diameters, for example, the case where only electrode mixture layer-constituting particles with a single particle size are present. Thus, this can contribute to an increase in the energy density.

The electrode mixture layer-constituting particles preferably give, by a laser diffractive scattering method, a particle size distribution chart in which the modal diameter DA of the peak A is smaller than the modal diameter DB of the peak B and the ratio PA/PB of the frequency PA at the modal diameter DA to the frequency PB at the modal diameter DB is in the range of 0.15 or more and 1.5 or less. The ratio is more preferably 0.2 or more and 1 or less.

As described above, a PA/PB value of 0.15 or more and 1.5 or less means that the proportion of the peak A assigned to distribution of particles having a smaller particle diameter relative to the peak B is sufficient, that is, the dispersion is appropriately achieved and the dispersion is not short nor excessive. When the dispersion is appropriately achieved, the interaction between the active material and the binder is sufficient, and the binder can be deposited so as to sufficiently cover the active material surface and the remaining alkaline component. Thus, an increase in the resistance of the electrode can be prevented, and, in turn, deterioration in the capacity of the nonaqueous electrolyte battery can be sufficiently prevented.

The average particle size (D50) of the electrode mixture layer-constituting particles in the particle size distribution chart is preferably in the range of 1.5 µm or more and 6 µm or less, and more preferably in the range of 2 µm or more and 5 µm or less.

When the average particle size (D50) of the electrode mixture layer-constituting particles is in the range of 1.5 µm or more and 6 µm or less, the binder is sufficiently deposited so as to cover the active material surface and the remaining alkaline component, and is not excessively deposited. Thus, the reaction area of the active material surface is present in an appropriate degree, and the reaction resistance is not largely increased. As a result, by reducing the reactivity on the active material surface, that is, reducing the reactivity in the electrode, the effect of preventing the decrease in the capacity of the nonaqueous electrolyte battery is sufficiently achieved.

<Current Collector>

The current collector is preferably formed of aluminum foil or aluminum alloy foil. The aluminum foil and aluminum alloy foil preferably have an average crystal grain size of 50 µm or less, more preferably 30 µm or less, and further preferably 5 µm or less. When the average crystal grain size is 50 µm or less, the strength of the aluminum foil or aluminum alloy foil can be drastically increased, and the density of the positive electrode can be increased by a high press pressure and the battery capacity can be increased.

The current collector has a thickness of 20 µm or less, and more preferably 15 µm or less. The aluminum foil preferably has a purity of 99% by mass or more. The aluminum alloy is preferably an alloy containing one or more elements selected from the group consisting of magnesium, zinc, and silicon. On the other hand, the content of a transition metal, such as iron, copper, nickel, or chromium, is preferably 1% by mass or less.

Regarding the blending proportions of the active material, the conducting agent, and the binder in the electrode mixture layer, preferably, the proportion of the active material is in the range of 80 to 95% by mass, the proportion of the conducting agent is in the range of 2 to 20% by mass, and the proportion of the binder is in the range of 0.01 to 2.8% by mass.

The electrode mixture layer preferably has a porosity of 20% or more and 50% or less. An electrode having an electrode mixture layer with such a porosity has a high density and is superior in affinity to a nonaqueous electrolyte. The porosity is more preferably 25% or more and 40% or less.

The electrode mixture layer preferably has a density of 2.5 g/cm$^3$ or more.

Next, a measurement method of a particle size distribution of the electrode mixture layer, a measurement method of a 19F-NMR spectrum of the binder component extracted from the electrode mixture layer, and a measurement method of the weight average molecular weight of the binder component extracted from the electrode mixture layer will be described. An extraction method of the electrode mixture layer is first described.

<Extraction Method of Electrode Mixture Layer>

For example, when the electrode is incorporated in a battery as a positive electrode, the positive electrode is first taken from the battery, is immersed in ethyl methyl carbonate to remove a lithium salt, and then is dried. For the positive electrode after drying, only the positive electrode mixture layer is peeled from the current collector with a spatula and is immersed in N-methylpyrrolidone (NMP) solvent. Then, the positive electrode mixture layer immersed in the NMP solvent is dispersed in the NMP solvent using ultrasonic wave to thereby prepare a sample.

The ultrasonic wave treatment in preparation of the above dispersion solvent is performed by, for example, a sample supply system attached to a laser diffractive distribution measurement device. The ultrasonic wave treatment is performed at an output of 40 W for 300 seconds.

<Measurement Method of Particle Size Distribution of Electrode Mixture Layer>

The sample obtained by the above method is subjected to a particle size distribution measurement for the constituting particles thereof using a laser diffractive distribution measurement device. As the measurement device, for example, Microtrac MT3100II manufactured by Microtrac BEL Corp. may be used.

Based on a particle size distribution chart obtained by the above measurement, a peak A and a peak B are determined according to the definition described above. In addition, based on this particle size distribution chart, the average particle size (D50) of particles constituting the electrode mixture layer can be determined.

<Measurement Method of 19F-NMR Spectrum of Binder Component Extracted from Electrode Mixture Layer>

The sample obtained by the above method is subjected to centrifugation, and the supernatant in which the solid components are removed and which contains the binder is taken to prepare a 19F-NMR measurement sample. Through measurement of this sample, the state not of the 19F present in the electrolyte but of the 19F in the electrode mixture layer can be measured. As the measurement device, for example, JNM-ECA500 manufactured by JEOL may be used. The observation nuclear is 19F, the magnetic field lock solvent is deuterium solvent (dimethylsulfoxide-d6 (DMSO-d6)), and the reference substance is 3,5-bistrifluoromethyl benzoic acid (3,5-BTFMBA).

According to the above-described definition, the obtained 19F-NMR spectrum is analyzed by checking, in the range of −90 ppm or higher and −88 ppm or lower, the presence or absence and the number of peaks that appear in the range of −95 ppm or higher and −87 ppm or lower and that have a peak intensity (%) of 5% or more relative to that of a reference peak.

<Measurement Method of Weight Average Molecular Weight of Binder Component Extracted from Electrode Mixture Layer>

To the sample obtained by the above method, for example, a N-methyl-2-methylpyrrolidone solvent having 0.1 mol/L of lithium chloride added therein is added, is stirred at 75 to 85° C. for 90 minutes, and is filtered with a filter to produce a measurement sample of the weight average molecular weight. As the measurement device, for example, a gel permeation chromatography (GPC) may be used. As a detector, a diffractive refractive index detector is used and as a column, for example, Shodex KF-806M manufactured by Showa Denko K.K. is used, at a flow rate of 0.5 mL/minute and at a column temperature of 40° C.

<Production Method of Electrode>

For example, an active material, a conductive material, and a binder are suspended in an appropriate solvent to obtain a dispersion solution. This dispersion solution is subjected to a dispersion step using a bead mill or the like to obtain a slurry for forming an electrode mixture layer. The obtained slurry is applied on one side or both sides of a current collector and is dried to obtain a stacked structure in which electrode mixture layers are stacked. The stacked structure is pressed and, if necessary, is cut to fabricate an electrode. A conductive tab may be welded to the current collector.

When the dispersion is performed using a bead mill, for example, by compositely adjusting the bead material, bead diameter, bead filling rate, blade rotation speed, and treatment time, peaks may appear in the range of −90 ppm or higher and −88 ppm or lower in a 19F-NMR spectrum. Furthermore, by controlling the particle size of the electrode mixture layer-constituting particles in this manner, the particle sizes and frequencies of the peak A and peak B can be adjusted.

In order to allow peaks to appear in the range of −90 ppm or higher and −88 ppm or lower in a 19F-NMR spectrum, the secondary particles of the active material need to be disentangled. By such disentanglement of secondary particles, the binder can be deposited on the surface of the active material particles so as to sufficiently cover the surface of the active material particles. Thus, in order to allow peaks to appear in the above range, dispersion using a large collision energy, such as bead mill dispersion, is preferably performed. Specifically, dispersion with a bead mill, such as a sand grinder, is preferably applied on a paste-form solution in which materials for forming an electrode mixture layer and a solvent, such as N-methylpyrrolidone (NMP), are mixed.

When the dispersion solution is strongly dispersed by compositely adjusting the bead material, bead diameter, bead filling rate, blade rotation speed, and treatment time, for example, the binder can be deposited so as to sufficiently cover the surface of the active material particles. Thus, peaks appear in the range of −90 ppm or higher and −88 ppm or lower in a 19F-NMR spectrum. On the other hand, when the dispersion solution is weakly dispersed by compositely adjusting the bead material, bead diameter, bead filling rate, blade rotation speed, and treatment time, for example, the binder cannot be deposited so as to sufficiently cover the surface of the active material particles. Thus, no peaks appear in the range of −90 ppm or higher and −88 ppm or lower in a 19F-NMR spectrum.

When peaks are allowed to appear in the range of −90 ppm or higher and −88 ppm or lower in a 19F-NMR spectrum, for example, as a result of compositely adjusting the bead material, bead diameter, bead filling rate, blade rotation speed, and treatment time, the ratio PA/PB is also in the range of 0.15 or more and 1.5 or less.

The first embodiment as described above provides an electrode. The electrode includes an active material-containing layer that contains active material particles and a binder containing a polymer. The active material particles contain a lithium-containing nickel-cobalt-manganese composite oxide represented by $Li_aNi_{(1-x-y)}Co_xMn_yM_zO_2$ (0.95≤a≤1.2, 0<x≤0.5, 0<y≤0.5, 0<z≤0.1, x≥y, 0.4≤1−x−y≤0.8, M is at least one element selected from the group consisting of B, Mg, Al, Si, Ca, Ti, Zn, Zr, Sn, and W). The polymer has a repeating unit derived from vinylidene fluoride, and one or more peaks in the nuclear magnetic resonance spectrum with fluorine-19 as the detection nucleus are located in the range of −90 ppm or higher and −88 ppm or lower. By having such a configuration, an increase in the resistance can be prevented in the electrode according to the first embodiment. As a result, the nonaqueous electrolyte battery can exhibit superior input-output characteristics and superior lifetime characteristics.

Second Embodiment

A nonaqueous electrolyte battery according to a second embodiment includes a positive electrode, a negative electrode, a nonaqueous electrolyte, and a container member.

As the positive electrode, for example, the electrode of the first embodiment is used. A positive electrode current collector may include a part in which a positive electrode active material-containing layer is not supported on the surface thereof. This part can act as a positive electrode tab. Alternatively, the positive electrode may include a positive electrode tab provided separately from the positive electrode current collector.

The negative electrode includes a negative electrode active material-containing layer as a negative electrode mixture layer. The negative electrode may further include a negative electrode current collector. The negative electrode active material-containing layer can be supported on at least one surface of the negative electrode current collector. That is, the negative electrode current collector can support the negative electrode active material-containing layer on one side or on both sides thereof. In addition, the negative electrode current collector may include a part in which the negative electrode active material-containing layer is not supported on the surface thereof. This part can act as a negative electrode tab. Alternatively, the negative electrode may include a negative electrode tab provided separately from the negative electrode current collector.

The positive electrode and the negative electrode may constitute an electrode group. In the electrode group, the positive electrode active material-containing layer and the negative electrode active material-containing layer can face each other, for example, via a separator.

The electrode group may have various structures. For example, the electrode group may have a stack structure. The electrode group of a stack structure can be obtained, for example, by alternately stacking a plurality of positive electrodes and a plurality of negative electrodes with a separator interposed between a positive electrode active material-containing layer and a negative electrode active material-containing layer. Alternatively, the electrode group may have a wound structure. A wound electrode group can be obtained, for example, by forming a stacked structure by stacking a separator, a negative electrode, another separator, and a positive electrode in this order, and winding the stacked structure.

The nonaqueous electrolyte battery according to the second embodiment can further include a positive electrode terminal and a negative electrode terminal. The positive electrode terminal can act, with a part thereof electrically connected to a part of the positive electrode, as a conductor for electrons moving between the positive electrode and an external terminal. The positive electrode terminal may be connected, for example, to the positive electrode current collector, in particular, to the positive electrode tab. Similarly, the negative electrode terminal can act, with a part thereof electrically connected to a part of the negative electrode, as a conductor for electrons moving between the negative electrode and an external terminal. The negative electrode terminal may be connected, for example, to the negative electrode current collector, in particular, to the negative electrode tab.

The container member houses the electrode group and a nonaqueous electrolyte. The electrode group may be impregnated with the nonaqueous electrolyte in the container member. A part of the positive electrode terminal and a part of the negative electrode terminal may be extended from the container member.

The positive electrode, negative electrode, nonaqueous electrolyte, separator, and container member will be described in more detail below.

<Positive Electrode>

As the positive electrode, for example, the electrode of the first embodiment is used.

<Negative Electrode>

The negative electrode includes a negative electrode current collector and a negative electrode active material-containing layer which is supported on one side or on both sides of the negative electrode current collector and which contains a negative electrode active material, a negative electrode conducting agent, and a binding agent.

The negative electrode active material contains a titanium-containing oxide. The kind of the negative electrode active materials may be one or may be two or more.

Examples of the titanium-containing oxide include a lithium-titanium composite oxide, an anatase-type titanium-containing oxide, a rutile-type titanium-containing oxide, a bronze-type titanium-containing oxide, an orthorhombic titanium-containing oxide, a monoclinic niobium-titanium-containing oxide, and a metal composite oxide containing Ti and at least one element selected from the group consisting of P, V, Sn, Cu, Ni, Nb, and Fe.

Examples of the lithium titanium composite oxide include a lithium titanium oxide and a lithium titanium composite oxide in which a part of the constituting elements of a lithium titanium oxide is substituted with a different element. Examples of the lithium titanium oxide include a lithium titanate having a spinel structure (for example, $Li_{4+x}Ti_5O_{12}$ (x is a value varied with charge-discharge, $0 \leq x \leq 3$)) and a Ramsdellite-type lithium titanate (for example, $Li_{2+y}Ti_3O_7$ (y is a value varied with charge-discharge, $0 \leq y \leq 3$)). On the other hand, the molar ratio of oxygen is formally represented as 12 in the spinel-type $Li_{4+x}Ti_5O_{12}$ and as 7 in the Ramsdellite-type $Li_{2+y}Ti_3O_7$. It is noted that the values may be varied due to the influence of the oxygen nonstoichiometry.

Examples of the metal composite oxide containing Ti and at least one element selected from the group consisting of P, V, Sn, Cu, Ni, Nb, and Fe include $TiO_2$—$P_2O_5$, $TiO_2$—$V_2O_5$, $TiO_2$—$P_2O_5$—$SnO_2$, and $TiO_2$—$P_2O_5$-MeO (Me is at least one element selected from the group consisting of Cu, Ni, and Fe). The metal composite oxide preferably has a microstructure having low crystallinity in which a crystal phase and an amorphous phase co-exist or an amorphous phase solely exists. Such a microstructure can largely enhance the cycle performance.

The compositions of the anatase-type, rutile-type, and bronze-type of titanium-containing oxides can be represented by $TiO_2$.

An example of the orthorhombic titanium-containing oxide is a compound represented by the general formula $Li_{2+w}Na_{2-x}M1_yTi_{6-z}M2_zO_{14+\delta}$ in which M1 is Cs and/or K and M2 contains at least one selected from the group consisting of Zr, Sn, V, Nb, Ta, Mo, W, Fe, Co, Mn, and Al with $0 \leq w \leq 4$, $0 \leq x \leq 2$, $0 \leq y \leq 2$, $0 \leq z < 6$, and $-0.5 \leq \delta \leq 0.5$.

An example of the monoclinic niobium-titanium-containing oxide is a compound represented by the general formula $Li_xTi_{1-y}M3_yNb_{2-z}M4_zO_{7+\delta}$ in which M3 is at least one selected from the group consisting of Zr, Si, Sn, Fe, Co, Mn, and Ni and M4 is at least one selected from the group consisting of V, Nb, Ta, Mo, W, and Bi with $0 \leq x \leq 5$, $0 \leq y < 1$, $0 \leq z < 2$, and $-0.3 \leq \delta \leq 0.3$.

A preferred negative electrode active material is one containing a lithium titanium composite oxide.

A negative electrode containing a titanium-containing oxide, such as a lithium titanium composite oxide, has a Li-storage potential of 0.4 V (vs. Li/Li$^+$) or more and thus, can prevent precipitation of metal lithium on the negative electrode surface when input-output is repeated at a large current. The negative electrode active material may contain an active material other than the lithium titanium composite oxide. In such a case, an active material having a Li-storage potential of 0.4 V (vs. Li/Li$^+$) or more is desirably used.

Examples of the binding agent include polytetrafluoroethylene (PTFE), poly(vinylidene fluoride) (PVdF), fluororubber, styrene butadiene rubber (SBR), carboxymethylcellulose (CMC), polyimide, and polyamide. The kind of the binding agents may be one or may be two or more.

Examples of the negative electrode conducting agent include carbon black, such as acetylene black and ketjen black, graphite, carbon fiber, carbon nanotube, and fullerene. The kind of the conducting agents may be one or may be two or more.

Regarding the blending proportions of the negative electrode active material, the conducting agent, and the binding agent in the negative electrode active material-containing layer, preferably, the proportion of the negative electrode active material is 70% by mass or more and 95% by mass or less, the proportion of the conducting agent is 0% by mass or more and 25% by mass or less, and the proportion of the binding agent is 2% by mass or more and 10% by mass or less. Blending the conducting agent in a proportion of 0% by mass or more leads to superior large current characteristics due to higher current collecting performance. In addition, the binding agent in an amount of 2% by mass or more leads to higher binding property between the negative electrode active material-containing layer and the negative electrode current collector, resulting in enhanced cyclic characteristics. On the other hand, from the viewpoint of higher capacity, the proportions of the negative electrode conducting agent and the binding agent are each preferably 10% by mass or less.

The current collector is preferably aluminum foil or aluminum alloy foil which is electrochemically stable at a potential in the range nobler than 1.0 V.

The negative electrode is fabricated, for example, by suspending a negative electrode active material, a negative electrode conducting agent, and a binding agent in an appropriate solvent, applying the obtained slurry on a negative electrode current collector, and drying the slurry to produce a negative electrode active material-containing layer, followed by pressing. Besides, a pellet that is formed of a negative electrode active material, a negative electrode conducting agent, and a binding agent may be used as a negative electrode active material-containing layer.

The negative electrode active material-containing layer preferably has a porosity of 20% or more and 50% or less. A negative electrode active material-containing layer having such a porosity is superior in affinity to a nonaqueous electrolyte, and the density can be increased. The porosity is more preferably 25% or more and 40% or less.

The density of the negative electrode active material-containing layer is preferably 2.0 g/cm$^3$ or more.

<Nonaqueous Electrolyte>

Examples of the nonaqueous electrolyte include a liquid-form nonaqueous electrolyte which is prepared by dissolving an electrolyte in a nonaqueous solvent and a gel-form nonaqueous electrolyte obtained by combining a liquid-form nonaqueous electrolyte and a polymer material into a composite.

Examples of electrolytes include lithium salts, such as lithium perchlorate ($LiClO_4$), lithium hexafluorophosphate ($LiPF_6$), lithium tetrafluoroborate ($LiBF_4$), hexafluoroarsenic lithium ($LiAsF_6$), lithium difluorophosphate ($LiPO_2F_2$), lithium trifluoromethanesulfonate ($LiCF_3SO_3$), lithium bis(trifluoromethylsulfonyl)imide [$LiN(CF_3SO_2)_2$], and lithium tetrafluoroaluminum ($LiAlF_4$). One electrolyte thereof may be used alone or two or more thereof may be mixed.

The electrolyte is preferably dissolved in a nonaqueous solvent in an amount in the range of 0.5 mol/L or more and 2.5 mol/L or less.

Examples of the nonaqueous solvent include organic solvents, for example, cyclic carbonates, such as ethylene carbonate (EC) and propylene carbonate (PC); chain carbonates, such as dimethyl carbonate (DMC), ethyl methyl carbonate (EMC), and diethyl carbonate (DEC); cyclic ethers, such as tetrahydrofuran (THF) and 2-methyltetrahydrofuran (2MeTHF); a chain ether, such as dimethoxyethene (DME); a cyclic ester, such as γ-butyrolactone (GBL); and acetonitrile (AN). One of the organic solvents may be used alone or two or more thereof may be used in mixture.

<Separator>

The separator is not particularly limited as long as it has an insulating property, and a porous film or nonwoven fabric of a polymer, such as polyolefin, cellulose, polyethylene terephthalate, poly(vinylidene fluoride) (PVdF), or vinylon, may be used. One of the materials for separator may be used or two or more thereof may be used in combination.

<Container Member>

The container member may be formed of a laminate film or may include a metallic container. When a metallic container is used, a lid may be integrated with the container or may be a separate member. The thickness of the metallic container is preferably 0.5 mm or less and more preferably 0.2 mm or less. Examples of the shape of the container member include a flat shape, a square shape, a cylindrical shape, a coin shape, a button shape, a sheet shape, and a stack shape. Besides a compact battery to be built in portable electron instruments, a large battery to be mounted on two- to four-wheeled vehicles may be applied.

A laminate film container member desirably has a thickness of 0.2 mm or less. An example of the laminate film is a multilayer film containing resin films and a metallic layer disposed between the resin films. The metallic layer is preferably aluminum foil or aluminum alloy foil for reducing the weight. As the resin films, for example, a polymer material, such as polypropylene (PP), polyethylene (PE), nylon, or polyethylene terephthalate (PET), may be used. The laminate film may be molded into a shape of the container member through sealing by heat fusion.

The metallic container is formed of aluminum, aluminum alloy, or the like. The aluminum alloy is preferably an alloy containing magnesium, zinc, silicon, or other elements. In the aluminum or aluminum alloy, the content of transition metals, such as iron, copper, nickel, and chromium, is preferably 100 ppm or lower in terms of enhancement of the long term reliability under a high temperature environment and the heat releasability.

The metallic container of aluminum or aluminum alloy desirably has an average crystal grain size of 50 μm or less, more preferably 30 μm or less, and further preferably 5 μm or less. With an average crystal grain size of 50 μm or less, the strength of the metallic container of aluminum or aluminum alloy can be dramatically increased, and the thickness of the container can further be reduced. As a result, a nonaqueous electrolyte battery which has a light weight, gives a high output, and is superior in the long-term reliability, and which is suited to mounting on a vehicle can be achieved.

Next, a specific example of the nonaqueous electrolyte battery according to the embodiment will be described with reference to the drawings.

Figure 2:
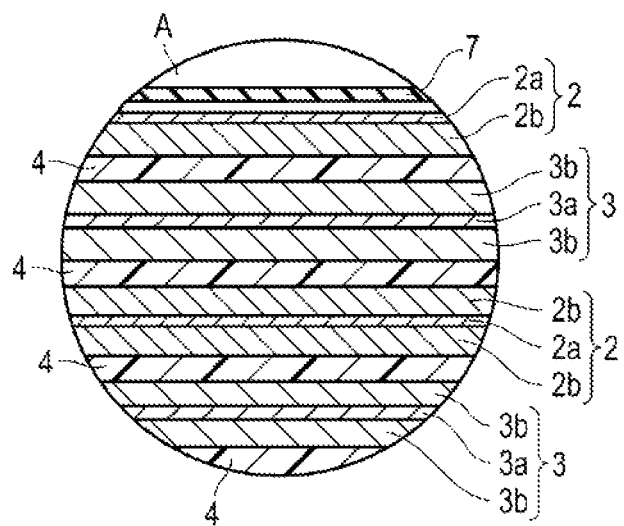
FIG. 2 is an enlarged cross-sectional view of the part A of the nonaqueous electrolyte battery illustrated in FIG. 1.

FIG. 1 is a perspective view with a part cut out illustrating an example of the nonaqueous electrolyte battery according to the second embodiment. FIG. 2 is an enlarged cross-sectional view of the part A of the nonaqueous electrolyte battery illustrated in FIG. 1.

A nonaqueous electrolyte battery 100 illustrated in FIG. 1 and FIG. 2 includes a flattened electrode group 1. The flattened electrode group 1 includes a negative electrode 2, a positive electrode 3, and a separator 4. The electrode group 1 has a structure in which the negative electrode 2 and the positive electrode 3 with the separator 4 interposed therebetween are wound into a spiral form with a flat shape. The wound electrode group will be described here. Alternatively, the electrode group may be a stacked electrode group in which a plurality of the negative electrodes 2, separators 4, and positive electrodes 3 are stacked.

As shown in FIG. 2, the negative electrode 2 includes a negative electrode current collector 2a and a negative electrode active material-containing layer 2b supported on the negative electrode current collector 2a. As shown in FIG. 2, the positive electrode 3 includes a positive electrode current collector 3a and a positive electrode active material-containing layer 3b supported on the positive electrode current collector 3a.

As shown in FIG. 1, in the nonaqueous electrolyte battery 100, a strip-shaped negative electrode terminal 5 is electrically connected to the negative electrode 2. More specifically, the negative electrode terminal 5 is connected to the negative electrode current collector 2a. In addition, a strip-shaped positive electrode terminal 6 is electrically connected the positive electrode 3. More specifically, the positive electrode terminal 6 is connected to the positive electrode current collector 3a.

The nonaqueous electrolyte battery 100 further includes an exterior container 7 of a laminate film as a container. That is, the nonaqueous electrolyte battery 100 includes a container member including the exterior container 7 formed of a laminate film.

The electrode group 1 is housed in the exterior container 7 of a laminate film. However, ends of the negative electrode terminal 5 and the positive electrode terminal 6 are extended from the exterior container 7. A nonaqueous electrolyte not shown is housed in the exterior container 7 of a laminate film. The electrode group 1 is impregnated with the nonaqueous electrolyte. A peripheral part of the exterior container 7 is heat-sealed, and thus, the electrode group 1 and the nonaqueous electrolyte are sealed therein.

Figure 3:
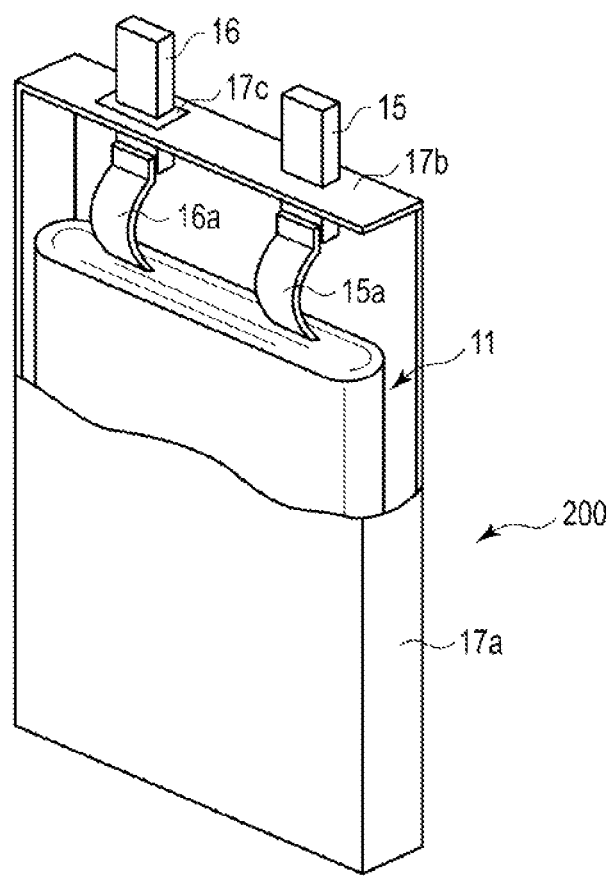
FIG. 3 is a perspective view with a part cut out illustrating another example of the nonaqueous electrolyte battery according to the second embodiment.

Next, another example of the nonaqueous electrolyte battery according to the second embodiment will be described in detail with reference to FIG. 3. FIG. 3 is a perspective view with a part cut out illustrating another example of the nonaqueous electrolyte battery according to the second embodiment.

A nonaqueous electrolyte battery 200 illustrated in FIG. 3 is different from the nonaqueous electrolyte battery 100 illustrated in FIG. 1 and FIG. 2 in that the container member includes a metallic container 17a and a sealing plate 17b.

A flattened electrode group 11 includes a negative electrode, a positive electrode, and a separator in the same manner as the electrode group 1 in the nonaqueous electrolyte battery 100 illustrated in FIG. 1 and FIG. 2. The electrode group 11 has the same structure as that of the electrode group 1 with the proviso that, in the electrode group 11, instead of the negative electrode terminal 5 and the positive electrode terminal 6, a negative electrode tab 15a and a positive electrode tab 16a are respectively connected to the negative electrode and the positive electrode as described later.

In the nonaqueous electrolyte battery 200 illustrated in FIG. 3, the electrode group 11 is housed in the metallic container 17a. The metallic container 17a further houses a nonaqueous electrolyte not shown. The metallic container 17a is sealed with the metallic sealing plate 17b. The metallic container 17a and the sealing plate 17b constitute, for example, an exterior can as a container member.

One end of the negative electrode tab 15a is electrically connected to a negative electrode current collector and another end thereof is electrically connected to a negative electrode terminal 15. One end of the positive electrode tab 16a is electrically connected to a positive electrode current collector and another end thereof is electrically connected a positive electrode terminal 16 fixed on the sealing plate 17b. The positive electrode terminal 16 is fixed to the sealing plate 17b via an insulating member 17c. The positive electrode terminal 16 and the sealing plate 17b are electrically insulated by the insulating member 17c.

The nonaqueous electrolyte battery according to the second embodiment includes the electrode according to the first embodiment. Accordingly, the nonaqueous electrolyte battery according to the second embodiment can achieve superior input-output characteristics and cycle life characteristics.

Third Embodiment

A third embodiment provides a battery pack. This battery pack includes the nonaqueous electrolyte battery according to the second embodiment.

The battery pack according to the third embodiment may include a plurality of nonaqueous electrolyte batteries. The plurality of nonaqueous electrolyte batteries may be electrically connected in series or may be electrically connected in parallel. Alternatively, the plurality of nonaqueous electrolyte batteries may be connected in combination of in-series and in-parallel.

The battery pack according to the third embodiment may include, for example, five nonaqueous electrolyte batteries. The nonaqueous electrolyte batteries may be connected in series. The nonaqueous electrolyte batteries connected in series may constitute a battery module. That is, the battery pack according to the third embodiment may include a battery module.

The battery pack according to the third embodiment may include a plurality of battery modules. The plurality of battery modules may be connected in series, in parallel, or in combination of in-series and in-parallel.

Figure 4:
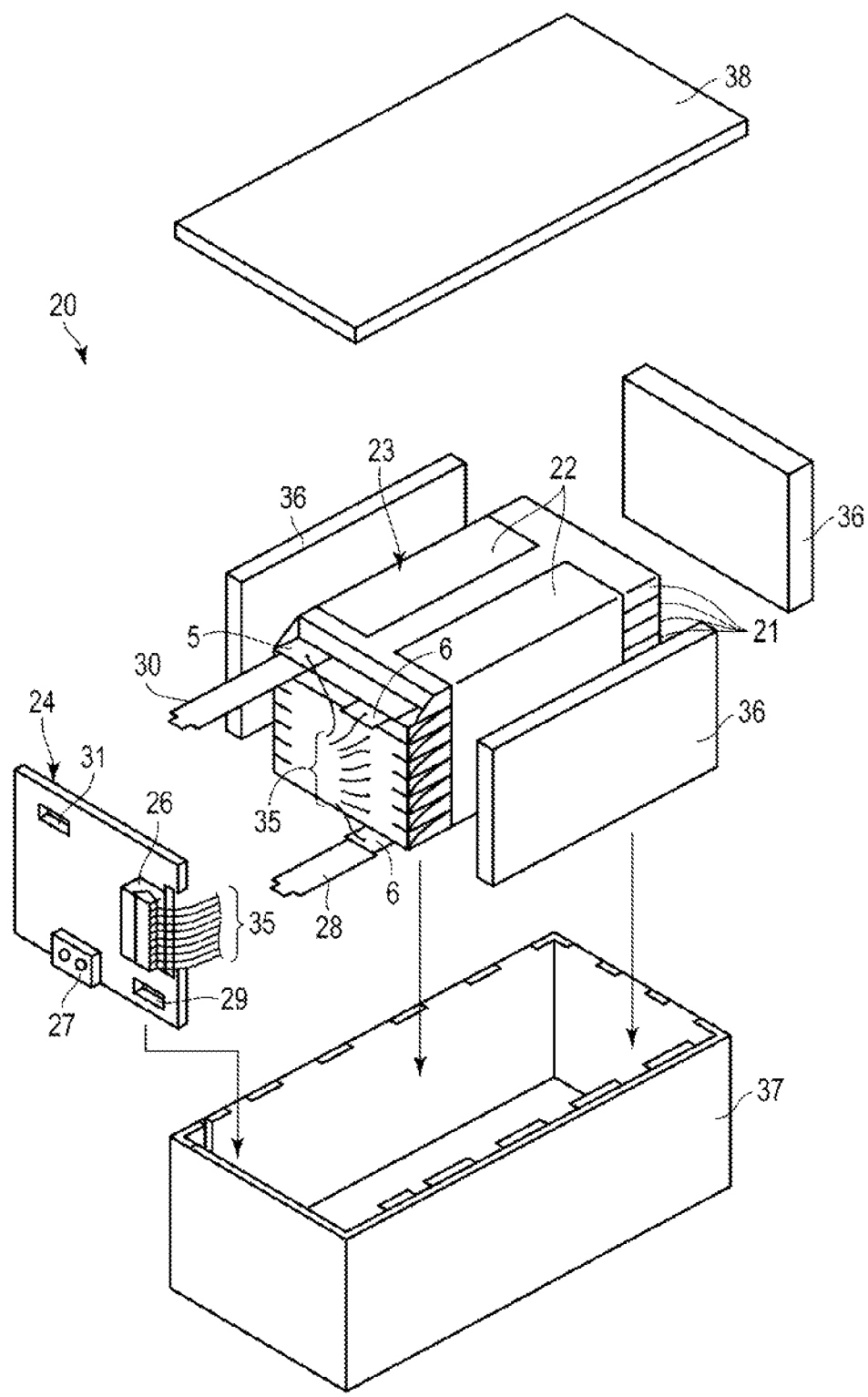
FIG. 4 is an exploded perspective view illustrating an example of a battery pack according to a third embodiment.
Figure 5:
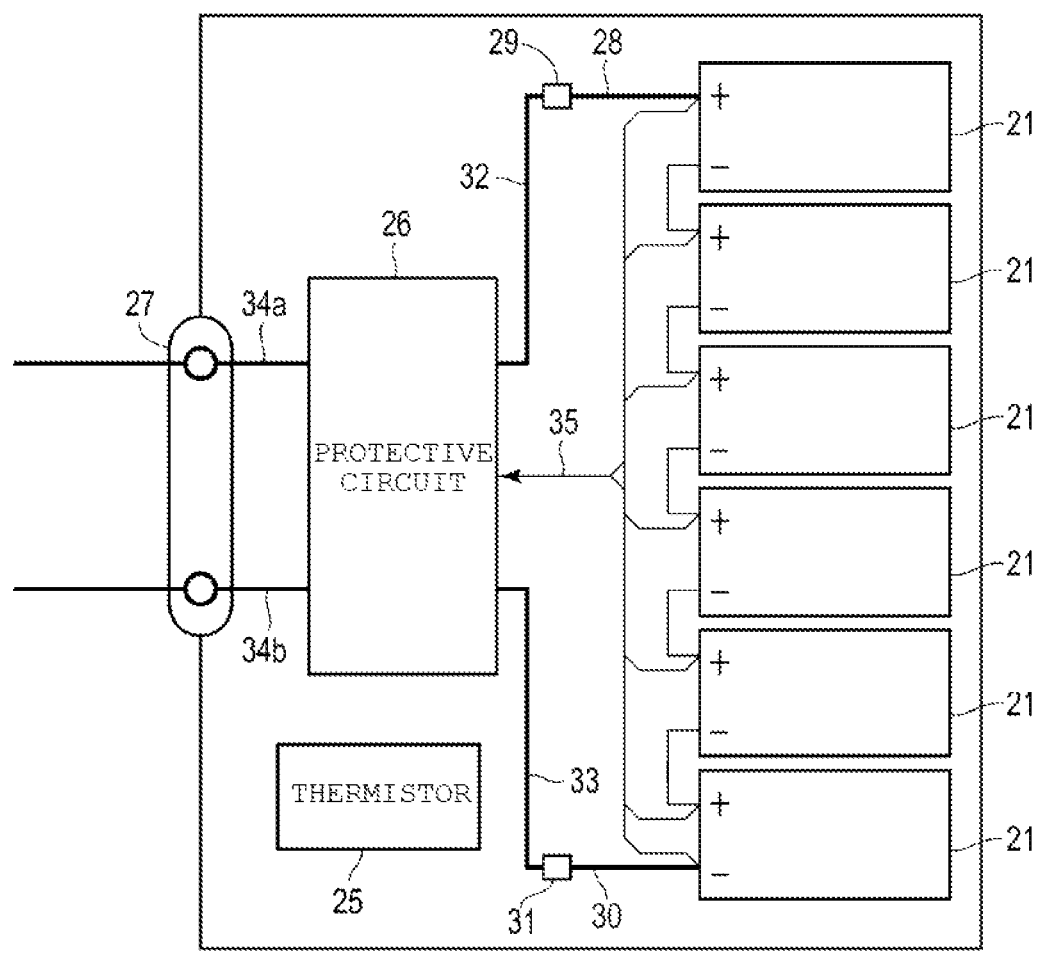
FIG. 5 is a block diagram illustrating an example of the electric circuit of the battery pack illustrated in FIG. 4.

An example of the battery pack according to the third embodiment will be described below with reference to FIG. 4 and FIG. 5. FIG. 4 is an exploded perspective view illustrating an example of the battery pack according to the third embodiment. FIG. 5 is a block diagram illustrating an example of the electric circuit of the battery pack illustrated in FIG. 4.

A battery pack 20 illustrated in FIG. 4 and FIG. 5 includes a plurality of single batteries 21. The single batteries 21 may each be the flattened nonaqueous electrolyte battery 100 of an example according to the second embodiment as described with reference to FIG. 1.

In the plurality of single batteries 21, the negative electrode terminals 5 and the positive electrode terminals 6 which externally extend are stacked so as to be arranged in the same direction and are banded with an adhesive tape 22 to form a battery module 23. The single batteries 21 are electrically connected to each other in series as shown in FIG. 5.

A printed circuit board 24 faces the side surface in which the negative electrode terminals 5 and the positive electrode terminals 6 of the single batteries 21 extend. On the printed circuit board 24, a thermistor 25, a protective circuit 26, and an external device-energizing terminal 27 are mounted as shown in FIG. 5. It is noted that an insulation plate (not shown) is attached to the surface of the printed circuit board 24 that faces the battery module 23 to avoid unrequired connection to wirings for the battery modules 23.

A positive electrode-side lead 28 is connected to the positive electrode terminal 6 that is positioned on the lowermost layer of the battery modules 23, and the tip thereof is inserted in a positive electrode-side connector 29 of the printed circuit board 24 to be electrically connected thereto. A negative electrode-side lead 30 is connected to the negative electrode terminal 5 that is positioned on the uppermost layer of the battery modules 23, and the tip thereof is inserted in a negative electrode-side connector 31 of the printed circuit board 24 to be electrically connected thereto. The connectors 29 and 31 are connected to the protective circuit 26 via wirings 32 and 33 formed on the printed circuit board 24.

The thermistor 25 detects a temperature of the single batteries 21 and the detected signal is transmitted to the protective circuit 26. The protective circuit 26 can break a plus-side wiring 34a and a minus-side wiring 34b between the protective circuit 26 and the external device-energizing terminal 27 under a certain condition. An example of the certain condition is a condition that the detected temperature of the thermistor 25 is a certain temperature or higher. Another example of the certain condition is a condition that overcharging, overdischarging, overcurrent, or the like of the single batteries 21 is detected. The detection of overcharging or the like is performed for each of the single batteries 21 or for the whole battery module 23. It is noted that, in detection for each of the single batteries 21, the battery voltage may be detected or the positive electrode potential or the negative electrode potential may be detected. In the latter case, a lithium electrode used as a reference electrode is inserted in each of the single batteries 21. In the battery pack 20 of FIG. 4 and FIG. 5, a wiring 35 is connected to each of the single batteries 21 for detecting the voltage. The detected signal is transmitted to the protective circuit 26 via the wiring 35.

A protective sheet 36 of a rubber or a resin is disposed on each of the three side surfaces of the battery module 23 except for the side surface in which the positive electrode terminals 6 and the negative electrode terminals 5 protrude.

The battery module 23 is housed in a housing container 37 together with the protective sheets 36 and the printed circuit board 24. That is, the protective sheet 36 is disposed on each of the two interior side surfaces of the long-side direction of the housing container 37 and one interior side surface of the short-side direction thereof, and the printed circuit board 24 is disposed on the other interior side surface of the short-side direction thereof. The battery module 23 is located in a space surrounded by the protective sheets 36 and the printed circuit board 24. A lid 38 is attached to the upper surface of the housing container 37.

It is noted that, for fixing the battery module 23, a thermal shrinkage tape may be used in place of the adhesive tape 22. In this case, a protective sheet is disposed on both the side surfaces of the battery module, then a thermal shrinkage tape is wound, and the thermal shrinkage tape is shrunk with heat to band the battery module.

FIGS. 4 and 5 show a form in which the single batteries 21 are connected in series. Alternatively, the single batteries 21 may be connected in parallel for increasing the battery capacity. Furthermore, the assembled battery packs may be connected in series and/or in parallel.

In addition, the aspect of the battery pack according to the third embodiment is appropriately modified depending on the application. The application of the battery pack according to the third embodiment is preferably an application in which a cycle performance as a large current performance is desired. Specific examples of the application include an application as an electrical source for a digital camera and an application for mounting on a vehicle, such as a two- to four-wheel hybrid electric vehicle, a two- to four-wheel electric vehicle, or an assisted bicycle. As the application of the battery pack according to the third embodiment, an application for mounting on a vehicle is particularly suitable.

The battery pack according to the third embodiment includes the nonaqueous electrolyte battery according to the second embodiment. Accordingly, the battery pack according to the third embodiment can achieve superior input-output characteristics and cycle life characteristics.

EXAMPLES

The embodiments will be described in more detail below with reference to examples, but the embodiments are not limited to the examples described below.

Example 1

In Example 1, a positive electrode and a nonaqueous electrolyte battery of Example 1 are fabricated according to the following procedure.

<Fabrication of Positive Electrode>

As a positive electrode active material, particles having an average particle size of 5 μm of a lithium-containing nickel-cobalt-manganese composite oxide represented by a composition formula $LiNi_{0.6}Co_{0.25}Mn_{0.15}O_2$ were provided. Graphite and acetylene black are provided as conducting agents, and a polymer material (poly(vinylidene fluoride) (PVdF) in which a carbonyl group-containing substituent was incorporated) which had poly(vinylidene fluoride) (PVdF) as a basic skeleton and had a substituent containing a carbonyl group was provided as a binder. The $LiNi_{0.6}Co_{0.25}Mn_{0.15}O_2$, graphite, acetylene black, and the polymer material were dispersed in N-methylpyrrolidone (NMP) at a mass ratio of 89:5:5:1. In this manner, a paste-form dispersion solution was obtained. The obtained dispersion solution was subjected to bead mill dispersion to uniformly disperse the conducting agents and the active material, whereby a slurry was obtained.

Bead mill dispersion was performed using a bead-type wet fine particle dispersion pulverizer: Sand Grinder manufactured by AIMEX Co., Ltd. Glass beads having a diameter of 2 mm were used as media with a bead filling rate of 45%. As the dispersion conditions, the rotation speed was 800 rpm and the treatment time was 60 minutes.

The slurry obtained after the bead mill dispersion was uniformly applied on both the front and back surfaces of a strip-shaped current collector of aluminum foil having a thickness of 20 μm and was dried to form positive electrode active material-containing layers. Then, the dried strip body was subjected to a press treatment to obtain a positive electrode.

<Fabrication of Negative Electrode>

$Li_4Ti_5O_{12}$ of a spinel structure as a negative electrode active material, graphite as a conducting agent, poly(vinylidene fluoride) (PVdF) as a binder were provided. The $Li_4Ti_5O_{12}$, graphite, and poly(vinylidene fluoride) (PVdF) were dispersed in N-methylpyrrolidone (NMP) at a mass ratio of 85:10:5 to prepare a slurry. The obtained slurry was uniformly applied on both the front and back surfaces of a strip-shaped current collector of aluminum foil having a thickness of 20 μm and was dried to form negative electrode active material-containing layers. Then, the dried strip body was subjected to a press treatment to obtain a negative electrode.

<Fabrication of Electrode Group>

As a separator, two polyethylene resin separators were provided. Next, the separator, the positive electrode, the separator, and the negative electrode were superposed in this order to form a stacked structure. The obtained stacked structure was wound in a spiral form using a winding core so that the negative electrode was positioned on the outermost periphery. Next, the winding core was removed, and then, the wound stacked structure was pressed with heat to thus fabricate a wound electrode group.

<Preparation of Nonaqueous Electrolyte>

Ethylene carbonate (EC) and ethyl methyl carbonate (EMC) were mixed at a volume ratio of 1:2 to prepare a mixed solvent. In the mixed solvent, lithium hexafluorophosphate ($LiPF_6$) was dissolved as an electrolyte salt at a concentration of 1 M(mol/L) to prepare a nonaqueous electrolyte.

<Fabrication of Battery>

A positive electrode terminal and a negative electrode terminal were respectively attached to the positive electrode and the negative electrode of the wound electrode group obtained as above, and the electrode group was placed in a laminate container. Then, in the container in which the electrode group was housed, the nonaqueous electrolyte was injected from a liquid inlet. Next, the liquid inlet was sealed to thus fabricate a nonaqueous electrolyte battery. In this manner, a flattened nonaqueous electrolyte battery having a thickness of 3.5 mm, a width of 35 mm, a height of 65 mm, and a mass of 25 g was fabricated.

Example 2

In Example 2, a battery was fabricated in the same manner as in Example 1 except for using poly(vinylidene fluoride) (PVdF) as a binder and setting the treatment time of bead mill dispersion to 50 minutes in fabrication of the positive electrode as shown in Table 1.

Example 3

In Example 3, a battery was fabricated in the same manner as in Example 1 except for adding a chloro group-containing substituent-incorporated poly(vinylidene fluoride) (PVdF) in an amount of 1.5% by mass as a binder in fabrication of the positive electrode as shown in Table 1.

Example 4

In Example 4, a battery was fabricated in the same manner as in Example 1 except for using $LiNi_{0.5}Co_{0.3}Mn_{0.2}O_2$ as a positive electrode active material, adding an ester bond-containing substituent-incorporated poly(vinylidene fluoride) (PVdF) in an amount of 1.5% by mass as a binder, and setting the treatment time of bead mill dispersion to 50 minutes in fabrication of the positive electrode as shown in Table 1.

Example 5

In Example 5, a battery was fabricated in the same manner as in Example 1 except for using $LiNi_{0.7}Co_{0.018}Mn_{0.12}O_2$ as a positive electrode active material in fabrication of the positive electrode as shown in Table 1.

Example 6

In Example 6, a battery was fabricated in the same manner as in Example 1 except for using $LiNi_{0.8}Co_{0.15}Mn_{0.05}O_2$ as a positive electrode active material in fabrication of the positive electrode as shown in Table 1.

Example 7

In Example 7, a battery was fabricated in the same manner as in Example 1 except for using $LiNi_{0.6}Co_{0.24}Mn_{0.15}Al_{0.01}O_2$ as a positive electrode active material in fabrication of the positive electrode as shown in Table 1.

Example 8

In Example 8, a battery was fabricated in the same manner as in Example 1 except for setting the filling rate to 40% by mass, the rotation speed to 500 rpm, and the treatment time to 50 minutes in bead mill dispersion in fabrication of the positive electrode as shown in Table 1.

Example 9

In Example 9, a battery was fabricated in the same manner as in Example 1 except for setting the filling rate to 50% by mass and the treatment time to 100 minutes in bead mill dispersion in fabrication of the positive electrode as shown in Table 1.

Comparative Example 1

In Comparative Example 1, a battery was fabricated in the same manner as in Example 1 except for adding the binder in an amount of 1.5% by mass and setting the filling rate to 40% by mass, the rotation speed to 500 rpm, and the treatment time to 30 minutes in bead mill dispersion in fabrication of the positive electrode as shown in Table 1.

Comparative Example 2

In Comparative Example 2, a battery was fabricated in the same manner as in Example 1 except for adding the binder in an amount of 2.5% by mass and setting the filling rate to 50% by mass and the treatment time to 120 minutes in bead mill dispersion in fabrication of the positive electrode as shown in Table 1.

Comparative Example 3

In Comparative Example 3, a battery was fabricated in the same manner as in Example 1 except for adding poly(vinylidene fluoride) (PVdF) in an amount of 2.5% by mass as a binder and setting the filling rate to 40% by mass, the rotation speed to 500 rpm, and the treatment time to 30 minutes in bead mill dispersion in fabrication of the positive electrode as shown in Table 1.

Comparative Example 4

In Comparative Example 4, a battery was fabricated in the same manner as in Example 1 except for using $LiNi_{0.05}Co_{0.2}Mn_{0.3}O_2$ as a positive electrode active material and adding poly(vinylidene fluoride) (PVdF) in an amount of 2.5% by mass as a binder in fabrication of the positive electrode as shown in Table 1.

Comparative Example 5

In Comparative Example 5, a battery was fabricated in the same manner as in Example 1 except for using $LiNi_{0.5}Co_{0.2}Mn_{0.3}O_2$ as a positive electrode active material and adding the binder in an amount of 2.5% by mass in fabrication of the positive electrode as shown in Table 1.

Comparative Example 6

In Comparative Example 6, a battery was fabricated in the same manner as in Example 1 except for using $LiNi_{1/3}Co_{1/3}Mn_{1/3}O_2$ as a positive electrode active material in fabrication of the positive electrode as shown in Table 1.

Figure 6:
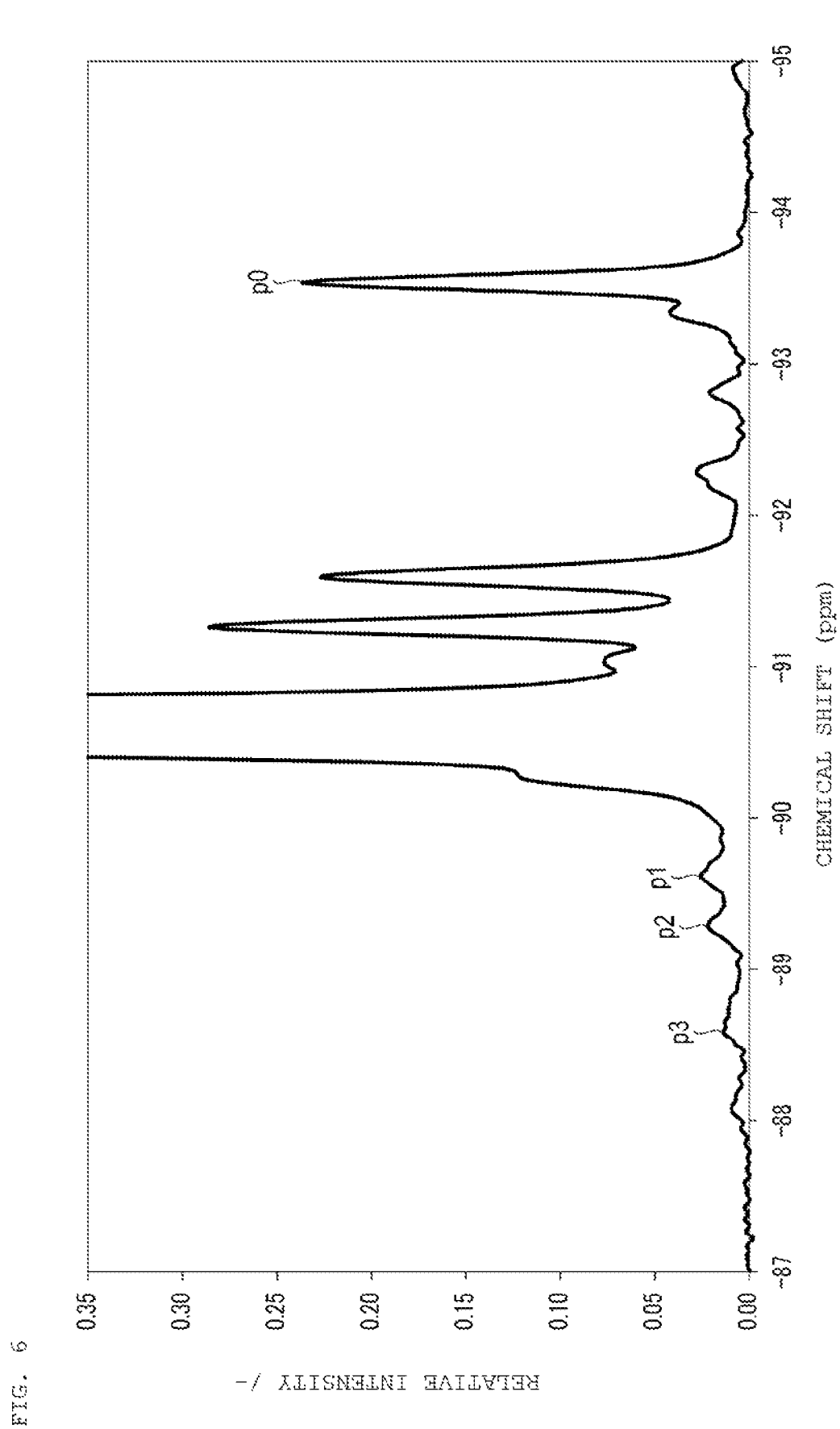
FIG. 6 is a 19F-NMR spectrum of a binder component extracted from an active material-containing layer of a positive electrode of Example 1.
Figure 7:
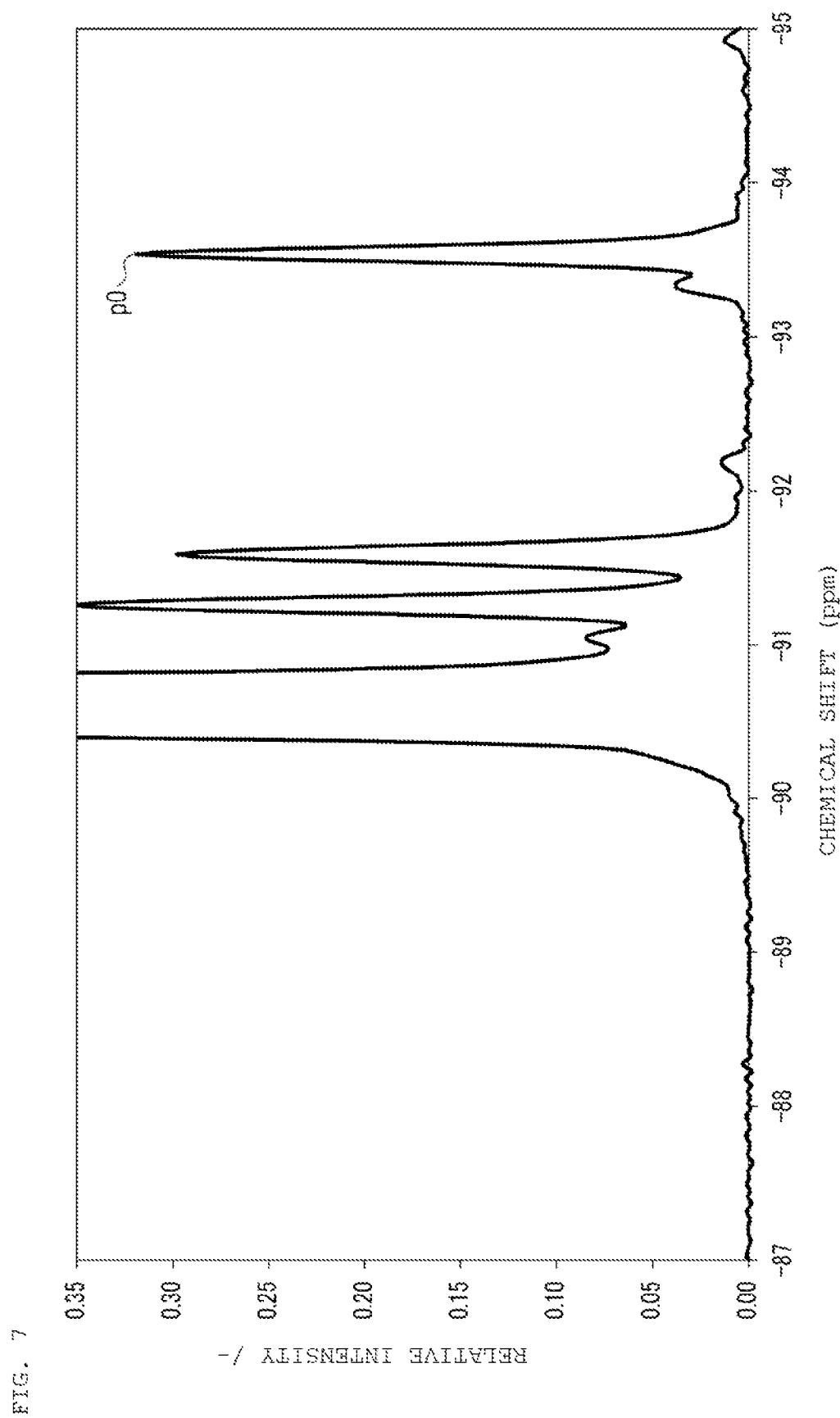
FIG. 7 is a 19F-NMR spectrum of a binder component extracted from an active material-containing layer of a positive electrode of Comparative Example 3.

Example 3 were subjected to 19F-NMR spectrum measurement according to the method described above. The results are respectively shown in FIG. 6 and FIG. 7. The spectrum shown in FIG. 6 is one 19F-NMR spectrum of the binder component extracted from the active material-containing layer of the positive electrode of Example 1. The spectrum shown in FIG. 7 is one 19F-NMR spectrum of the binder component extracted from the active material-containing layer of the positive electrode of Comparative Example 3. The horizontal axis in FIG. 6 and FIG. 7 is the chemical shift (ppm). The vertical axis in FIG. 6 and FIG. 7 is the relative intensity (abundance). Table 2 shows the number of peaks in the range of −90 ppm or higher and −88 ppm or lower counted according to the method as described above.

In the spectrum shown in FIG. 6, a reference peak p0 is present in the range of −94 ppm or higher and −93 ppm or lower. It is found from the spectrum shown in FIG. 6 that, in Example 1, peaks p1 to p3 are present in the range of −90

TABLE 1

| Unit | Positive electrode active material — | Electrolyte Solvent Volume ratio | Electrolyte salt — | Binder — | Amount of binder added % by mass | Bead mill dispersion condition | | |
|---|---|---|---|---|---|---|---|---|
| | | | | | | Filling rate % by mass | Rotation speed rpm | Treatment time minute |
| Example 1 | $LiNi_{0.6}Co_{0.25}Mn_{0.15}O_2$ | EC:EMC = 1:2 | 1M-LiPF$_6$ | Carbonyl group-containing substituent-incorporated PVdF | 1.0 | 45 | 800 | 60 |
| Example 2 | $LiNi_{0.6}Co_{0.25}Mn_{0.15}O_2$ | EC:EMC = 1:2 | 1M-LiPF$_6$ | PVdF | 1.0 | 45 | 800 | 50 |
| Example 3 | $LiNi_{0.6}Co_{0.25}Mn_{0.15}O_2$ | EC:EMC = 1:2 | 1M-LiPF$_6$ | Chloro group-containing substituent-incorporated PVdF | 1.5 | 45 | 800 | 60 |
| Example 4 | $LiNi_{0.5}Co_{0.3}Mn_{0.2}O_2$ | EC:EMC = 1:2 | 1M-LiPF$_6$ | Ester bond-containing substituent-incorporated PVdF | 1.5 | 45 | 800 | 50 |
| Example 5 | $LiNi_{0.7}Co_{0.18}Mn_{0.12}O_2$ | EC:EMC = 1:2 | 1M-LiPF$_6$ | Carbonyl group-containing substituent-incorporated PVdF | 1.0 | 45 | 800 | 60 |
| Example 6 | $LiNi_{0.8}Co_{0.15}Mn_{0.05}O_2$ | EC:EMC = 1:2 | 1M-LiPF$_6$ | Carbonyl group-containing substituent-incorporated PVdF | 1.0 | 45 | 800 | 60 |
| Example 7 | $LiNi_{0.6}Co_{0.24}Mn_{0.15}Al_{0.01}O_2$ | EC:EMC = 1:2 | 1M-LiPF$_6$ | Carbonyl group-containing substituent-incorporated PVdF | 1.0 | 45 | 800 | 60 |
| Example 8 | $LiNi_{0.6}Co_{0.25}Mn_{0.15}O_2$ | EC:EMC = 1:2 | 1M-LiPF$_6$ | Carbonyl group-containing substituent-incorporated PVdF | 1.0 | 40 | 500 | 50 |
| Example 9 | $LiNi_{0.6}Co_{0.25}Mn_{0.15}O_2$ | EC:EMC = 1:2 | 1M-LiPF$_6$ | Carbonyl group-containing substituent-incorporated PVdF | 1.0 | 50 | 800 | 100 |
| Comparative Example 1 | $LiNi_{0.6}Co_{0.25}Mn_{0.15}O_2$ | EC:EMC = 1:2 | 1M-LiPF$_6$ | Carbonyl group-containing substituent-incorporated PVdF | 1.5 | 40 | 500 | 30 |
| Comparative Example 2 | $LiNi_{0.6}Co_{0.25}Mn_{0.15}O_2$ | EC:EMC = 1:2 | 1M-LiPF$_6$ | Carbonyl group-containing substituent-incorporated PVdF | 2.5 | 50 | 800 | 120 |
| Comparative Example 3 | $LiNi_{0.6}Co_{0.25}Mn_{0.15}O_2$ | EC:EMC = 1:2 | 1M-LiPF$_6$ | PVdF | 2.5 | 40 | 500 | 30 |
| Comparative Example 4 | $LiNi_{0.5}Co_{0.2}Mn_{0.3}O_2$ | EC:EMC = 1:2 | 1M-LiPF$_6$ | PVdF | 2.5 | 45 | 800 | 60 |
| Comparative Example 5 | $LiNi_{0.5}Co_{0.2}Mn_{0.3}O_2$ | EC:EMC = 1:2 | 1M-LiPF$_6$ | Carbonyl group-containing substituent-incorporated PVdF | 2.5 | 45 | 800 | 60 |
| Comparative Example 6 | $LiNi_{1/3}Co_{1/3}Mn_{1/3}O_2$ | EC:EMC = 1:2 | 1M-LiPF$_6$ | Carbonyl group-containing substituent-incorporated PVdF | 1.0 | 45 | 800 | 60 |

(19F-NMR Spectrum Measurement of Binder Component Extracted from Positive Electrode Active Material-Containing Layer)

The binder components extracted from the positive electrode active material-containing layers in the nonaqueous electrolyte batteries of Example 1 and Comparative ppm or higher and −88 ppm or lower, that is, one or more peaks are present in the range of −90 ppm or higher and −88 ppm or lower. On the other hand, in the spectrum shown in FIG. 7, a reference peak p0 is present in the range of −94 ppm or higher and −93 ppm or lower. It is found from the spectrum shown in FIG. 7 that, in Comparative Example 3, no peaks are present in the range of −90 ppm or higher and −88 ppm or lower. This is considered because no interaction occurred between the active material particle surface and the binder to cause no distortion in the basic skeleton of the binder component.

Also for Examples 2 to 9, it was found that a reference peak p0 was present in the range of −94 ppm or higher and −93 ppm or lower, and that one or more peaks were present in the range of −90 ppm or higher and −88 ppm or lower as shown in Table 2. In Comparative Examples 2 to 6, a reference peak p0 was present in the range of −94 ppm or higher and −93 ppm or lower, but, as shown in Table 2, no peaks were found in the range of −90 ppm or higher and −88 ppm or lower.

(Evaluation Method)
<Particle Size Distribution Measurement by Laser Diffractive Scattering Method>

The positive electrode in each battery fabricated in Examples 1 to 9 and Comparative Examples 1 to 6 was subjected to the particle size distribution measurement according to the method as described above to obtain a particle size distribution chart. In addition, a peak A and a peak B according to each example were determined based on the obtained particle size distribution chart, and the average particle size (D50) of the particles constituting the positive electrode active material-containing layer was calculated. The results are shown in Table 2.

Figure 8:
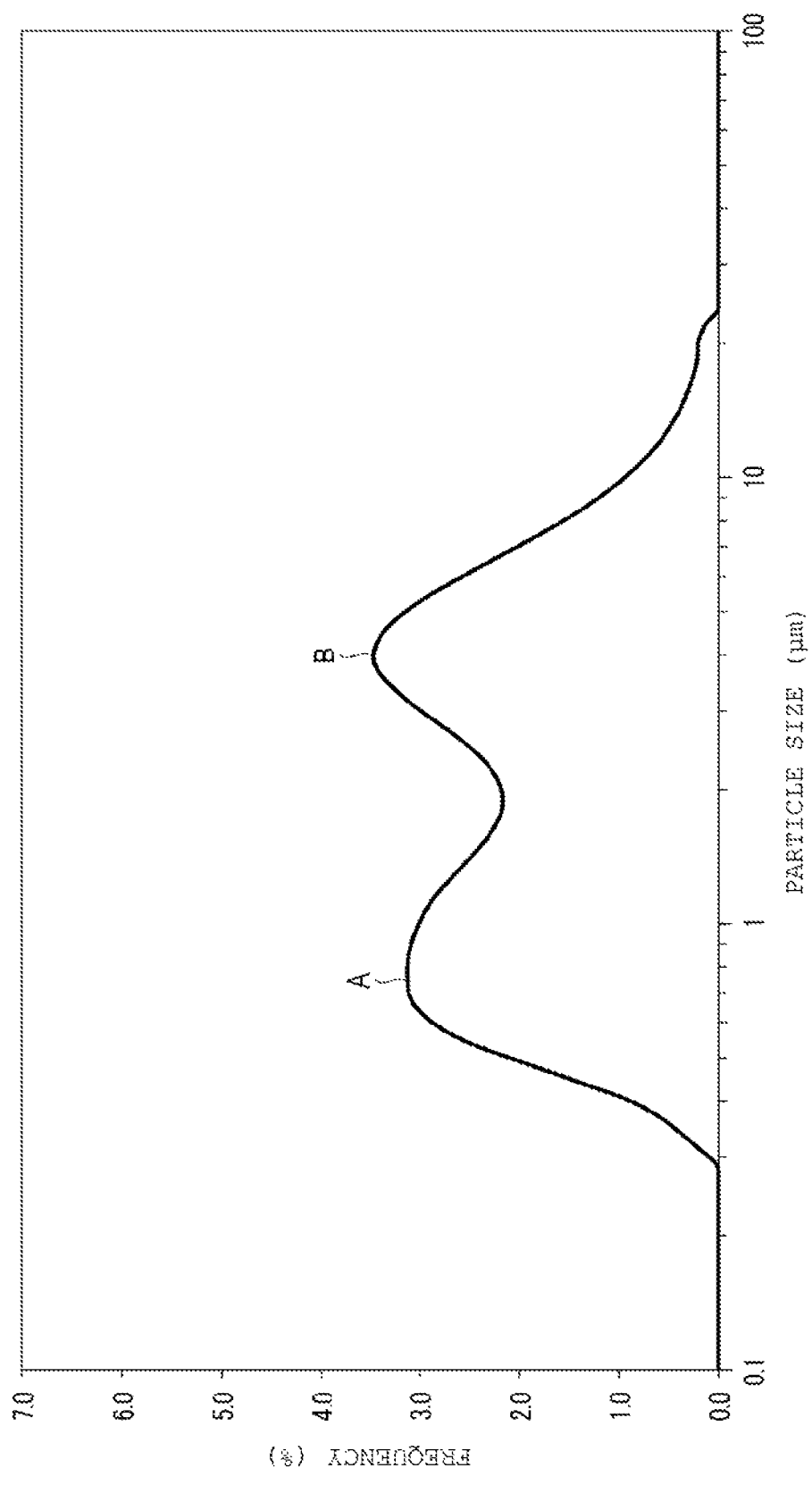
FIG. 8 is a particle size distribution chart of particles constituting the active material-containing layer of the positive electrode of Example 1.

FIG. 8 is a particle size distribution chart of the particles constituting the positive electrode active material-containing layer of Example 1. In FIG. 8, the horizontal axis represents the particle size (μm) and the vertical axis represents the frequency (%). As shown in FIG. 8, the chart has a peak A and a peak B with different modal diameters from each other. Since the modal diameter DA of the peak A is 0.8 μm and the modal diameter DB of the peak B is 4.2 μm, the particle size DA is smaller than the particle size DB. In addition, the frequency PA corresponding to the peak top of the peak A is 3.1% and the frequency PB corresponding to the peak top of the peak B is 3.4%. Thus, the ratio PA/PB was 0.9. That is, the ratio PA/PB was in the range of 0.2 or more and 1.5 or less.

<Evaluation of Input-Output Characteristics>

For each nonaqueous electrolyte battery fabricated in Examples 1 to 9 and Comparative Examples 1 to 6, the input-output characteristics were evaluated by the following method. The battery in a state of charge of 100% (SOC 100%) was continuously discharged under a temperature condition of 25° C. at a current value of 1C and 10C to respectively measure the 1C discharge capacity and the 10C discharge capacity. The ratio C(10C)/C(1C) obtained by dividing the 10C discharge capacity by the 1C discharge capacity was used as a measure for evaluating the input-output characteristics. The results are shown in Table 2.

<Evaluation of Cycle Life Characteristics>

Each nonaqueous electrolyte battery fabricated in Example 1 to 9 and Comparative Example 1 to 6 was subjected to a cycle test under a temperature condition of 45° C. by the following method to evaluate the rate of capacity maintenance and the rate of resistance increase. The results are shown in Table 2.

Specifically, first, at 25° C., the battery was discharged from a state of charge of 50% (SOC50%) at a current value of 1C and 10C, and the battery resistance value R1 (1 cyc) was calculated based on the battery voltage after discharging for 10 seconds.

Next, at 45° C., the battery was repeatedly subjected to a 2C/2C cycle test with a cycle of charging at a current value of 2C and discharging at a current value of 2C defined as one cycle (2C/2C cycle). In the cycle test, the number of cycles in which the rate of capacity maintenance, that is, the ratio (C(n)/C(1)) of the discharge capacity after performing multiple (n) times of cycles to the initial discharge capacity, became 80% was measured.

In addition, when 500 cycles were performed, the resistance value after 500 cycles, R500 (500 cyc), was measured in the same manner as the measurement of the resistance value R1 (1 cyc) before the cycle test, and R500 was divided by R1 to calculate the rate of resistance increase.

TABLE 2

| Unit | 19F-NMR Peak of binder extract — | Particle size DA μm | Particle Size DB μm | Frequency PA % | Frequency PB % | Ratio PA/PB — | Average particle size of positive electrode mixture layer-constituting particles (D50) μm | Discharge capacity ratio C(10C)/C(1C) % | Rate of capacity maintenance in 45° C. cycles times | Rate of resistance increase in 45° C. cycles — |
|---|---|---|---|---|---|---|---|---|---|---|
| Example 1 | 3 | 0.8 | 4.2 | 3.1 | 3.4 | 0.9 | 2 | 90 | 3000 | 1.15 |
| Example 2 | 2 | 0.6 | 6 | 1.15 | 5.4 | 0.21 | 4.4 | 88 | 3200 | 1.1 |
| Example 3 | 2 | 1 | 6.5 | 2.13 | 4.22 | 0.5 | 5 | 90 | 2800 | 1.2 |
| Example 4 | 2 | 1.2 | 5.1 | 1.98 | 5.4 | 0.37 | 3.7 | 92 | 3000 | 1.15 |
| Example 5 | 3 | 0.9 | 4.5 | 2.85 | 3.17 | 0.9 | 2 | 90 | 2900 | 1.15 |
| Example 6 | 3 | 0.8 | 4.7 | 2.9 | 2 | 1.5 | 2.1 | 90 | 2800 | 1.2 |
| Example 7 | 3 | 0.8 | 4.2 | 3.1 | 3.4 | 0.9 | 2 | 90 | 3000 | 1.15 |
| Example 8 | 2 | 0.7 | 6 | 1.12 | 6.5 | 0.17 | 5.1 | 88 | 3000 | 1.15 |
| Example 9 | 3 | 0.8 | 4 | 2.8 | 2 | 1.4 | 2.5 | 91 | 2900 | 1.15 |
| Comparative Example 1 | 0 | 0.7 | 6 | 1.1 | 10.5 | 0.1 | 4.1 | 82 | 2200 | 1.45 |
| Comparative Example 2 | 0 | 1.5 | 8.53 | 7.3 | 1.23 | 5.9 | 6.5 | 93 | 1800 | 1.6 |
| Comparative Example 3 | 0 | 0.65 | 6.1 | 0.9 | 9 | 0.1 | 6.5 | 83 | 2000 | 1.6 |
| Comparative Example 4 | 0 | 1 | 6.5 | 2.13 | 4.22 | 0.5 | 5 | 88 | 2100 | 1.5 |

TABLE 2-continued

| Unit | 19F-NMR Peak of binder extract — | Particle size DA μm | Particle Size DB μm | Frequency PA % | Frequency PB % | Ratio PA/PB — | Average particle size of positive electrode mixture layer-constituting particles (D50) μm | Discharge capacity ratio C(10C)/C(1C) % | Rate of capacity maintenance in 45° C. cycles times | Rate of resistance increase in 45° C. cycles — |
|---|---|---|---|---|---|---|---|---|---|---|
| Comparative Example 5 | 0 | 1 | 6.5 | 2.13 | 4.22 | 0.5 | 5 | 88 | 2100 | 1.45 |
| Comparative Example 6 | 0 | 1 | 6.5 | 2.13 | 4.22 | 0.5 | 5.2 | 88 | 2000 | 1.4 |

In Table 2, the "particle size DA" represents the modal diameter of the peak A. The "particle size DB" represents the modal diameter of the peak B. The "average particle size (D50) of positive electrode mixture layer-constituting particles" represents the average particle size (D50) of particles constituting the positive electrode active material-containing layer. The average particle size (D50) is a value calculated based on the particle size distribution chart obtained from the particle size distribution measurement performed on the positive electrode. The "discharge capacity ratio C(10C)/C(1C)" is the ratio C(10C)/C(1C) obtained from the input-output characteristics evaluation described above. The "rate of capacity maintenance in 45° C. cycles" is the number of cycles measured in the above evaluation of cycle life characteristics. The "rate of resistance increase in 45° C. cycles" is the ratio R500/R1 of the resistance value after 500 cycles, R500 (500 cyc), to the resistance value before the cycle test, R1 (1 cyc), measured in the evaluation of cycle life characteristics as described above.

As shown in Table 2, the nonaqueous electrolyte batteries of Examples 1 to 9 showed a larger number of cycles in which the rate of capacity maintenance in 45° C. cycles became 80% than the nonaqueous electrolyte batteries of Comparative Examples 1 to 6. In addition, the nonaqueous electrolyte batteries according to Example 1 to 9 showed a smaller rate of resistance increase in 45° C. cycles than the nonaqueous electrolyte batteries of Comparative Examples 1 to 6.

It is found from the results that, in the nonaqueous electrolyte batteries of Examples 1 to 9, the increase in the resistance is prevented as compared with in the nonaqueous electrolyte batteries of Comparative Examples 1 to 6. This is considered because, in the nonaqueous electrolyte batteries of Comparative Examples 1 to 6, the number of 19F-NMR peaks of the binder extract liquid was zero, and thus no interaction occurred between the active material particle surface and the binder so that an appropriate covering state was not obtained.

In addition, the nonaqueous electrolyte batteries of Examples 1 to 9 in which the particle size DA is smaller than the particle size DB and the ratio PA/PB is in the range of 0.15 or more and 1.5 or less were superior both in the input-output characteristics and the cycle life in a good balance as compared with the nonaqueous electrolyte battery of Comparative Example 2 in which the ratio PA/PB is more than 1.5 and the nonaqueous electrolyte batteries of Comparative Examples 1 and 3 in which the ratio PA/PB is less than 0.15.

Examples 1 to 9 in which the particles constituting the positive electrode active material-containing layer have an average particle size (D50) in the range of 1.5 μm or more and 6 μm or less are superior in the input-output characteristics and the cycle life characteristics in good balance as compared with the Comparative Examples 2 and 3 having an average particle size (D50) outside the range of 1.5 μm or more and 6 μm or less.

That is, the electrode according to at least one of the embodiments and Examples described above includes an active material-containing layer containing active material particles and a binder containing a polymer, the active material particles containing a lithium-containing nickel-cobalt-manganese composite oxide represented by $Li_aNi_{(1-x-y)}Co_xMn_yM_zO_2$ ($0.9 \le a \le 1.2$, $0 < x \le 0.5$, $0 < y \le 0.5$, $0 < z \le 0.1$, $x \ge y$, $0.4 \le 1-x-y \le 0.8$, M is at least one element selected from the group consisting of B, Mg, Al, Si, Ca, Ti, Zn, Zr, Sn, and W), the polymer having a repeating unit derived from vinylidene fluoride and having one or more peaks in the nuclear magnetic resonance spectrum with fluorine-19 as the detection nucleus are located in the range of −90 ppm or higher and −88 ppm or lower. A nonaqueous electrolyte battery including the electrode can prevent an increase in the resistance. As a result, the nonaqueous electrolyte battery can exhibit superior input-output characteristics and superior lifetime characteristics.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the substance of the disclosure. The accompanying claims and their equivalents are intended to cover such forms or modifications as would fall within the scope and substance of the disclosure.

What is claimed is:

1. An electrode comprising:
    an active material-containing layer that comprises
        active material particles and
        a binder comprising a polymer,
    wherein the active material particles comprise a lithium-containing nickel-cobalt-manganese composite oxide represented by $Li_aNi_{(1-x-y)}Co_xMn_yM_zO_2$, wherein $0.9 \le a \le 1.2$, $0 < x \le 0.5$, $0 < y \le 0.5$, $0 < z \le 0.1$, $x \ge y$, $0.4 \le 1-x-y \le 0.8$, and M is at least one element selected from the group consisting of B, Mg, Al, Si, Ca, Ti, Zn, Zr, Sn, and W, and
    the polymer has a repeating unit derived from vinylidene fluoride, and is configured such that one or more peaks in a nuclear magnetic resonance spectrum with fluorine-19 as a detection nucleus are located in the range of −90 ppm or higher and −88 ppm or lower, and one or more peaks having a peak intensity relative to a reference peak of 5% or more and present in a range of from −94 ppm or higher and −93 ppm or lower.

2. The electrode of claim 1, wherein the polymer further comprises at least one selected from the group consisting of a carbonyl group, an ester bond, and a chloro group.

3. The electrode of claim 1, wherein
the active material-containing layer comprises active material-containing layer-constituting particles that contain the active material particles and the binder,
the active material-containing layer-constituting particles giving, by a laser diffractive scattering method, a particle size distribution chart having a peak A and a peak B with different modal diameters,
a modal diameter DA of the peak A being smaller than a modal diameter DB of the peak B, and
the ratio PA/PB of a frequency PA at the modal diameter DA to a frequency PB at the modal diameter DB being in the range of 0.15 or more and 1.5 or less.

4. The electrode of claim 2, wherein
the active material-containing layer comprises active material-containing layer-constituting particles that contain the active material particles and the binder,
the active material-containing layer-constituting particles giving, by a laser diffractive scattering method, a particle size distribution chart having a peak A and a peak B with different modal diameters,
a modal diameter DA of the peak A being smaller than a modal diameter DB of the peak B, and
the ratio PA/PB of a frequency PA at the modal diameter DA to a frequency PB at the modal diameter DB being in the range of 0.15 or more and 1.5 or less.

5. The electrode of claim 1, wherein the binder is contained in an amount of 0.2 parts by mass or more and 3.5 parts by mass or less relative to 100 parts by mass of the active material particles.

6. The electrode of claim 2, wherein the binder is contained in an amount of 0.2 parts by mass or more and 3.5 parts by mass or less relative to 100 parts by mass of the active material particles.

7. The electrode of claim 3, wherein the binder is contained in an amount of 0.2 parts by mass or more and 3.5 parts by mass or less relative to 100 parts by mass of the active material particles.

8. The electrode of claim 4, wherein the binder is contained in an amount of 0.2 parts by mass or more and 3.5 parts by mass or less relative to 100 parts by mass of the active material particles.

9. The electrode of claim 3, wherein the binder is contained in an amount of 0.2 parts by mass or more and 3.5 parts by mass or less relative to 100 parts by mass of the active material particles, and wherein the particle size distribution chart has an average particle size (D50) in the range of 1.5 μm or more and 6 μm or less.

10. The electrode of claim 4, wherein the binder is contained in an amount of 0.2 parts by mass or more and 3.5 parts by mass or less relative to 100 parts by mass of the active material particles, and wherein the particle size distribution chart has an average particle size (D50) in the range of 1.5 μm or more and 6 μm or less.

11. The electrode of claim 7, wherein
the particle size distribution chart has an average particle size (D50) in the range of 1.5 μm or more and 6 μm or less.

12. The electrode of claim 8, wherein the particle size distribution chart has an average particle size (D50) in the range of 1.5 μm or more and 6 μm or less.

13. A nonaqueous electrolyte battery comprising
a positive electrode comprising an active material-containing layer,
a negative electrode comprising a negative electrode active material, and
a nonaqueous electrolyte,
wherein the active material-containing layer comprises active material particles and a binder comprising a polymer,
wherein
the active material particles comprise a lithium-containing nickel-cobalt-manganese composite oxide represented by $Li_aNi_{(1-x-y)}Co_xMn_yM_zO_2$, wherein $0.9 \leq a \leq 1.2$, $0 < x \leq 0.5$, $0 < y \leq 0.5$, $0 < z \leq 0.1$, $x \geq y$, $0.4 \leq 1-x-y \leq 0.8$, and M is at least one element selected from the group consisting of B, Mg, Al, Si, Ca, Ti, Zn, Zr, Sn, and W, and
the polymer has a repeating unit derived from vinylidene fluoride, and is configured such that one or more peaks in a nuclear magnetic resonance spectrum with fluorine-19 as a detection nucleus are located in the range of −90 ppm or higher and −88 ppm or lower, and one or more peaks having a peak intensity relative to a reference peak of 5% or more are present in a range of from −94 ppm or higher and −93 ppm or lower.

14. The nonaqueous electrolyte battery of claim 13, wherein the polymer further comprises at least one selected from the group consisting of a carbonyl group, an ester bond, and a chloro group.

15. The nonaqueous electrolyte battery of claim 13, wherein
the active material-containing layer comprises active material-containing layer-constituting particles that contain the active material particles and the binder,
the active material-containing layer-constituting particles giving, by a laser diffractive scattering method, a particle size distribution chart having a peak A and a peak B with different modal diameters,
a modal diameter DA of the peak A being smaller than a modal diameter DB of the peak B, and
the ratio PA/PB of a frequency PA at the modal diameter DA to a frequency PB at the modal diameter DB being in the range of 0.15 or more and 1.5 or less.

16. The nonaqueous electrolyte battery of claim 13, wherein the binder is contained in an amount of 0.2 parts by mass or more and 3.5 parts by mass or less relative to 100 parts by mass of the active material particles.

17. The nonaqueous electrolyte battery of claim 13, wherein the negative electrode active material comprises at least one selected from the group consisting of a lithium titanium composite oxide, an titanium-containing oxide having at least partial anatase crystal structure, a titanium-containing oxide having at least partial rutile crystal structure, a bronze-titanium-containing oxide, an orthorhombic titanium-containing oxide, a monoclinic niobium titanium-containing oxide, and a metal composite oxide containing Ti and at least one element selected from the group consisting of P, V, Sn, Cu, Ni, Nb, and Fe.

18. The nonaqueous electrolyte battery of claim 14, wherein the negative electrode active material comprises at least one selected from the group consisting of a lithium titanium composite oxide, an titanium-containing oxide having at least partial anatase crystal structure, a titanium-containing oxide having at least partial rutile crystal structure, a bronze-titanium-containing oxide, an orthorhombic titanium-containing oxide, a monoclinic niobium titanium-containing oxide, and a metal composite oxide containing Ti and at least one element selected from the group consisting of P, V, Sn, Cu, Ni, Nb, and Fe.

19. The nonaqueous electrolyte battery of claim 15, wherein the negative electrode active material comprises at least one selected from the group consisting of a lithium titanium composite oxide, an titanium-containing oxide having at least partial anatase crystal structure, a titanium-containing oxide having at least partial rutile crystal structure, a bronze-titanium-containing oxide, an orthorhombic titanium-containing oxide, a monoclinic niobium titanium-containing oxide, and a metal composite oxide containing Ti and at least one element selected from the group consisting of P, V, Sn, Cu, Ni, Nb, and Fe.

20. The nonaqueous electrolyte battery of claim 16, wherein the negative electrode active material comprises at least one selected from the group consisting of a lithium titanium composite oxide, an titanium-containing oxide having at least partial anatase crystal structure, a titanium-containing oxide having at least partial rutile crystal structure, a bronze-titanium-containing oxide, an orthorhombic titanium-containing oxide, a monoclinic niobium titanium-containing oxide, and a metal composite oxide containing Ti and at least one element selected from the group consisting of P, V, Sn, Cu, Ni, Nb, and Fe.

* * * * *